United States Patent
Jung et al.

(10) Patent No.: US 10,474,263 B2
(45) Date of Patent: Nov. 12, 2019

(54) DISPLAY DEVICE AND METHOD OF MANUFACTURING THE SAME

(71) Applicant: Samsung Display Co., Ltd., Yongin-si, Gyeonggi-do (KR)

(72) Inventors: Hyun Soo Jung, Yongin-si (KR); Jin Woo Park, Yongin-si (KR); Ho Youn Kim, Yongin-si (KR); Hyun Chul Oh, Yongin-si (KR); Ung Soo Lee, Yongin-si (KR); Jun Young Lee, Yongin-si (KR); Su Hyuk Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 33 days.

(21) Appl. No.: 15/404,032

(22) Filed: Jan. 11, 2017

(65) Prior Publication Data
US 2017/0199608 A1 Jul. 13, 2017

(30) Foreign Application Priority Data
Jan. 12, 2016 (KR) .................. 10-2016-0003777

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01); *G06F 2203/04103* (2013.01); *G06F 2203/04111* (2013.01)

(58) Field of Classification Search
CPC ...... G06F 3/0412; G06F 3/0416; G06F 3/044; G06F 2203/04103; G06F 2203/04111
See application file for complete search history.

(56) References Cited

U.S. PATENT DOCUMENTS 8,330,339 B2   12/2012   Oh et al.
8,872,168 B2   10/2014   Choi et al.
(Continued)

FOREIGN PATENT DOCUMENTS

EP        2 722 737 A1     4/2014
KR   10-1056260 (B1)       8/2011
(Continued)

OTHER PUBLICATIONS

Extended European Search Report dated May 29, 2017 for European Patent Application No. EP 17 151 177.7, which cites the above-identified references numbered 1,2,3,7 and 8, and which shares priority of Korean Patent Application KR 10-2016-0003777 with subject U.S. Appl. No. 15/404,032.
(Continued)

*Primary Examiner* — Stacy Khoo
(74) *Attorney, Agent, or Firm* — Lewis Roca Rothgerber Christie LLP

(57) ABSTRACT

A display device and a method of manufacturing the same are disclosed. In one aspect, the display device includes a display area and a non-display area adjacent to the display area, a first substrate including a touch sensor in the display area and a touch sensor pad in the non-display area, and a second substrate opposing the first substrate, the second substrate including a pixel in the display area and a connection pad in the non-display area. An interlayer in the display area is provided between the first substrate and the second substrate, a plurality of conductive balls electrically connects the touch sensor pad and the connection pad, and an inter-bar in the non-display area is provided between the first substrate and the second substrate. The inter-bar is disposed adjacent to the connection pad, and the conductive balls have an average diameter that is greater than the height of the inter-bar.

42 Claims, 18 Drawing Sheets

(56) References Cited

U.S. PATENT DOCUMENTS

| | | |
|---|---|---|
| 9,076,985 B2 | 7/2015 | Sakamoto et al. |
| 9,184,409 B2 | 11/2015 | Choi et al. |
| 2003/0201155 A1 | 10/2003 | Katakami |
| 2008/0211754 A1 | 9/2008 | Park et al. |
| 2011/0147048 A1 | 6/2011 | Yamamoto et al. |
| 2012/0105344 A1 | 5/2012 | Ko et al. |
| 2013/0011969 A1 | 1/2013 | Chen et al. |
| 2013/0093697 A1 | 4/2013 | Sun |
| 2013/0270580 A1 | 10/2013 | Choi et al. |
| 2013/0273315 A1 | 10/2013 | Mansky et al. |
| 2014/0009400 A1 | 1/2014 | Poorter et al. |
| 2014/0167010 A1 | 6/2014 | Jung et al. |
| 2014/0204285 A1 | 7/2014 | Jang |
| 2014/0306260 A1 | 10/2014 | Yamazaki et al. |
| 2015/0060806 A1 | 3/2015 | Park et al. |
| 2015/0062101 A1 | 3/2015 | Kim et al. |
| 2015/0168788 A1 | 6/2015 | Song et al. |
| 2015/0208521 A1 | 7/2015 | Seo et al. |
| 2015/0230361 A1 | 8/2015 | Lo et al. |
| 2015/0234520 A1 | 8/2015 | Chen et al. |
| 2015/0263300 A1 | 9/2015 | Namkung et al. |
| 2015/0372026 A1 | 12/2015 | Sato |
| 2016/0147342 A1 | 5/2016 | Xiong et al. |

FOREIGN PATENT DOCUMENTS

| | | |
|---|---|---|
| KR | 10-1178914 (B1) | 8/2012 |
| KR | 10-2013-0039039 (A) | 4/2013 |
| KR | 10-2013-0115819 (A) | 10/2013 |
| KR | 10-1469485 (B1) | 12/2014 |
| KR | 10-2015-0024471 (A) | 3/2015 |
| KR | 10-2015-0025994 (A) | 3/2015 |
| KR | 10-2015-0026429 (A) | 3/2015 |
| KR | 10-1599610 (B1) | 2/2016 |

OTHER PUBLICATIONS

Extended European Search Report dated May 29, 2017 for European Patent Application No. EP 17 151 230.4, which cites the above-identified references numbered 1,2,4,5,6, and 7, and which shares priority of Korean Patent Application KR 10-2016-0003790 with U.S. Appl. No. 15/404,039, which is related to subject U.S. Appl. No. 15/404,032.

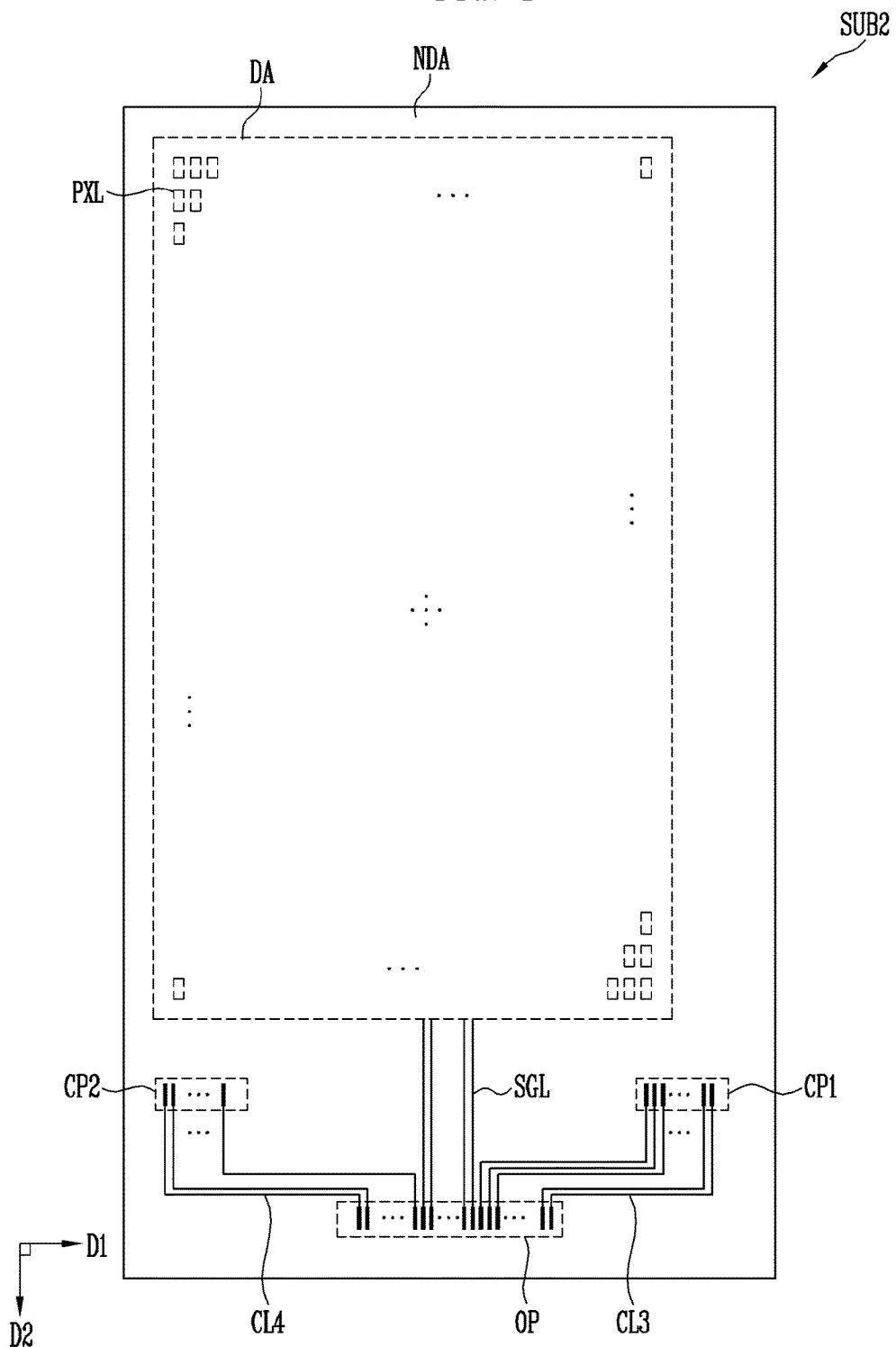

DISPLAY DEVICE AND METHOD OF MANUFACTURING THE SAME

CROSS-REFERENCE TO RELATED APPLICATION

This application claims priority to and the benefit of Korean Patent Application No. 10-2016-0003777, filed on Jan. 12, 2016, in the Korean Intellectual Property Office, the entire contents of which are incorporated herein by reference in their entirety.

This application relates to U.S. patent application entitled "DISPLAY DEVICE AND METHOD OF MANUFACTURING THE SAME," U.S. application Ser. No. 15/404,039, which is concurrently filed with this application and incorporated herein by reference in its entirety.

BACKGROUND

Field

The described technology generally relates to a display device and a method of manufacturing the same.

Description of the Related Technology

Recent touch screen display devices include touch recognition functionality to receive a user's touch as well as image display functionality.

Since these display devices do not require a separate input device, such as a keyboard and a mouse, the display devices have grown widely in market demand, particularly with mobile computing devices.

A typical display device is manufactured by forming a display panel and a touch panel through separate processes and then attaching the touch panel to the display panel.

However, since two separate manufacturing processes are necessary, this method is not efficient in terms of manufacturing cost and time. Therefore, there is a need for single processing manufacture of a touch panel and a display panel into an integrated panel.

SUMMARY OF CERTAIN INVENTIVE ASPECTS

One inventive aspect relates to a display device having reduced defects and including a touch sensor.

Another aspect is a method of manufacturing a display device including a touch sensor having reduced defects and including a touch sensor.

Another aspect is a display device including a display area where an image is displayed and a non-display area provided adjacent to the display area, the display device including: a first substrate including a touch sensor provided in the display area and a touch sensor pad part provided in the non-display area, a second substrate opposing the first substrate and including a pixel provided in the display area and a connection pad part provided in the non-display area, an interlayer provided in the display area between the first substrate and the second substrate, conductive balls connecting the touch sensor pad part and the connection pad part; and an inter-bar provided in the non-display area between the first substrate and the second substrate and arranged adjacent to the connection pad part, wherein an average diameter of the conductive balls is greater than a height of the inter-bar.

The conductive balls can have a spherical or elliptical shape, and the height of the inter-bar can be 50% to 65% of the average diameter of the conductive balls.

The average diameter of the conductive balls can be 16 μm to 24 μm. The height of the inter-bar is about 10 μm to about 13 μm. A difference between the average diameter of the conductive balls and the height of the inter-bar can be about 3 μm or more.

The inter-bar can include spacers and a binder having the spacers therein.

The spacer can control a height and width of the inter-bar (ITB). The spacers can be spherical. The spacers can have a diameter smaller than or equal to the height of the inter-bar. A ratio between the average diameter of the conductive balls and a diameter of the spacers can be 10:2 to 10:3.

The first substrate can have a rectangular shape including first to fourth sides sequentially connected to each other, and the touch sensor pad part can be provided corresponding to the first side. The interlayer has at least one side among the second to fourth sides, which is exposed to an outside.

At least a portion of the inter-bar can extend in a direction in which the first side extends. The inter-bar can extend from the fourth side to the second side along the first side. The inter-bar can be provided between the display area and the connection pad part as viewed in plan view.

The connection pad part can include a first connection pad part and a second connection pad part spaced apart from each other, and the inter-bar can be provided in plural corresponding to the first and second connection pad parts.

The second substrate can further include a driving pad part transmitting an image signal to the display area, and the inter-bar can be provided between the display area and the driving pad part. The inter-bar can be separated from the display area with the connection pad part interposed therebetween.

The inter-bar can include a first inter-bar provided between the display area and the connection pad part and a second inter-bar separated from the display area with the connection pad part interposed therebetween as viewed in plan view. The connection pad part can include a first connection pad part and a second connection pad part spaced apart from each other, and the first and the second inter-bars are spaced apart from each other so as to correspond to the first and second connection pad parts, respectively.

The first substrate can further include a driving pad part transmitting an image signal to the display area, and the second inter-bar can be provided between the display area and the driving pad part.

The display device can further include connection lines connecting the touch sensor and the touch sensor pad part to each other. The touch sensor can include a first sensing unit and a second sensing unit crossing each other, and the touch sensor pad part can include a first touch sensor pad part connected to the first sensing unit and a second touch sensor pad part connected to the second sensing unit. The connection pad part can include a first connection pad part corresponding to the first touch sensor pad part and a second connection pad part corresponding to the second touch sensor pad part.

The display device can further include an insulator surrounding the conductive balls.

In another aspect, the display device can be manufactured by a method including manufacturing a first substrate including a touch sensor in the display area and a touch sensor pad part in the non-display area, manufacturing a second substrate including a pixel in the display area and a connection pad part in the non-display area, forming an interlayer in the display area of one of the first and second substrates, forming an inter-bar in the non-display area of one of the first and second substrates, forming conductive balls on the connection pad part or the touch sensor pad part, and attaching the first substrate to the second substrate, wherein a diameter of the conductive balls is greater than a height of the inter-bar.

The manufacturing of the first substrate can include providing a first carrier substrate at a rear surface of the first base substrate, and forming the touch sensor and the touch sensor pad part on a top surface of the first base substrate, and the manufacturing of the second substrate can include providing a second carrier substrate at a rear surface of the second base substrate; and forming the pixel and the connection pad part on a top surface of the second base substrate.

Another aspect is a display device, comprising: a display area configured to display an image; a non-display area adjacent to the display area; a first substrate including a touch sensor in the display area and a touch sensor pad in the non-display area; a second substrate opposing the first substrate, the second substrate including a pixel in the display area and a connection pad in the non-display area; an interlayer in the display area provided between the first and second substrates; a plurality of conductive balls electrically connecting the touch sensor pad and the connection pad; and an inter-bar in the non-display area provided between the first and second substrates, the inter-bar disposed adjacent to the connection pad, wherein the conductive balls have an average diameter that is greater than the height of the inter-bar.

In the above display device, the conductive balls have a spherical or elliptical shape, wherein the height of the inter-bar is in the range of about 50% to about 65% of the average diameter of the conductive balls.

In the above display device, the average diameter of the conductive balls is in the range of about 16 µm to about 24 µm.

In the above display device, the height of the inter-bar is in the range of about 10 µm to about 13 µm.

In the above display device, the difference between the average diameter of the conductive balls and the height of the inter-bar is about 3 µm or more.

In the above display device, the inter-bar includes a plurality of spacers and a binder having the spacers therein.

In the above display device, the spacers are spherical.

In the above display device, the spacers have a diameter less than or equal to the height of the inter-bar.

In the above display device, a ratio of the average diameter of the conductive balls to diameters of the spacers is in the range of about 10:2 to about 10:3.

In the above display device, the first substrate has a rectangular shape including first to fourth sides, wherein the touch sensor pad is provided adjacent to the first side.

In the above display device, the interlayer has at least one side extends from the second to fourth sides.

In the above display device, the second to fourth sides face the exterior of the display device.

In the above display device, at least a portion of the inter-bar extends in a direction in which the first side extends.

In the above display device, the inter-bar extends from the fourth side to the second side along the first side.

In the above display device, the inter-bar is provided between the display area and the connection pad.

In the above display device, the connection pad includes a first connection pad and a second connection pad spaced apart from each other, wherein the inter-bar includes a plurality of inter-bars respectively formed adjacent to the first and second connection pads.

In the above display device, the second substrate further includes a driving pad configured to transmit an image signal to the display area, wherein the inter-bar is provided between the display area and the driving pad.

In the above display device, the inter-bar is separated from the display area with the connection pad interposed therebetween.

In the above display device, the inter-bar includes a first inter-bar provided between the display area and the connection pad and a second inter-bar separated from the display area with the connection pad interposed therebetween as viewed.

In the above display device, the connection pad includes a first connection pad and a second connection pad spaced apart from each other, wherein the first and second inter-bars are spaced apart from each other and respectively correspond to the first and second connection pads.

In the above display device, the first substrate further includes a driving pad configured to transmit an image signal to the display area, wherein the second inter-bar is provided between the display area and the driving pad.

The above display device further comprises connection lines electrically connecting the touch sensor and the touch sensor pad.

In the above display device, the touch sensor includes a first sensing unit and a second sensing unit crossing each other, wherein the touch sensor pad includes a first touch sensor pad connected to the first sensing unit and a second touch sensor pad connected to the second sensing unit.

In the above display device, the connection pad includes a first connection pad corresponding to the first touch sensor pad and a second connection pad corresponding to the second touch sensor pad.

The above display device further comprises an insulator surrounding the conductive balls.

Another aspect is a method of manufacturing a display device including a display area and a non-display area, the method comprising: forming a first substrate including a touch sensor in the display area and a touch sensor pad in the non-display area; forming a second substrate including a pixel in the display area and a connection pad in the non-display area; forming an interlayer in the display area of one of the first and second substrates; forming an inter-bar in the non-display area of one of the first and second substrates; forming a plurality of conductive balls over the connection pad or the touch sensor pad; and attaching the first substrate to the second substrate, wherein the conductive balls have an average diameter that is greater than the height of the inter-bar.

In the above method, the conductive balls are spherical, wherein the height of the inter-bar is in the range of about 50% to about 65% of the diameter of the conductive balls.

In the above method, the diameters of the conductive balls is in the range of about 16 µm to about 24 µm.

In the above method, the height of the inter-bar is in the range of about 10 µm to about 13 µm.

In the above method, the difference between the average diameter of the conductive balls and the height of the inter-bar is about 3 µm.

In the above method, the inter-bar includes a plurality of spacers and a binder having the spacers therein.

In the above method, the spacers are spherical.

In the above method, each of the spacers has a diameter that is less than or equal to the height of the inter-bar.

In the above method, a ratio of the average diameter of the conductive balls to the diameters of the spacers is in the range of about 10:2 to about 10:3.

In the above method, the first substrate has a rectangular shape including first to fourth sides, and wherein the non-display area faces the first side.

In the above method, at least a portion of the inter-bar extends in a direction in which the first side extends.

In the above method, the inter-bar is not formed at the second to fourth sides.

In the above method, the inter-bar is provided between the display area and the connecting pad.

In the above method, the second substrate further includes a driving pad transmitting an image signal to the display area, wherein the inter-bar is provided between the display area and the driving pad.

In the above method, the inter-bar includes a first inter-bar provided between the display area and the connection pad and a second inter-bar separated from the display area with the connection pad interposed therebetween.

In the above method, the forming of the first substrate comprises: providing a first carrier substrate at a rear surface of the first base substrate; and forming the touch sensor and the touch sensor pad on a top surface of the first base substrate, and wherein the forming of the second substrate comprises: providing a second carrier substrate at a rear surface of the second base substrate; and forming the pixel and the connection pad over a top surface of the second base substrate.

The above method further comprises: attaching the first substrate and the second substrate to each other; and subsequently removing the first carrier substrate and the second carrier substrate.

BRIEF DESCRIPTION OF THE DRAWINGS

FIG. 4 is a plan view illustrating a second substrate of FIG. 1.

DETAILED DESCRIPTION OF CERTAIN INVENTIVE EMBODIMENTS

Figure 1:
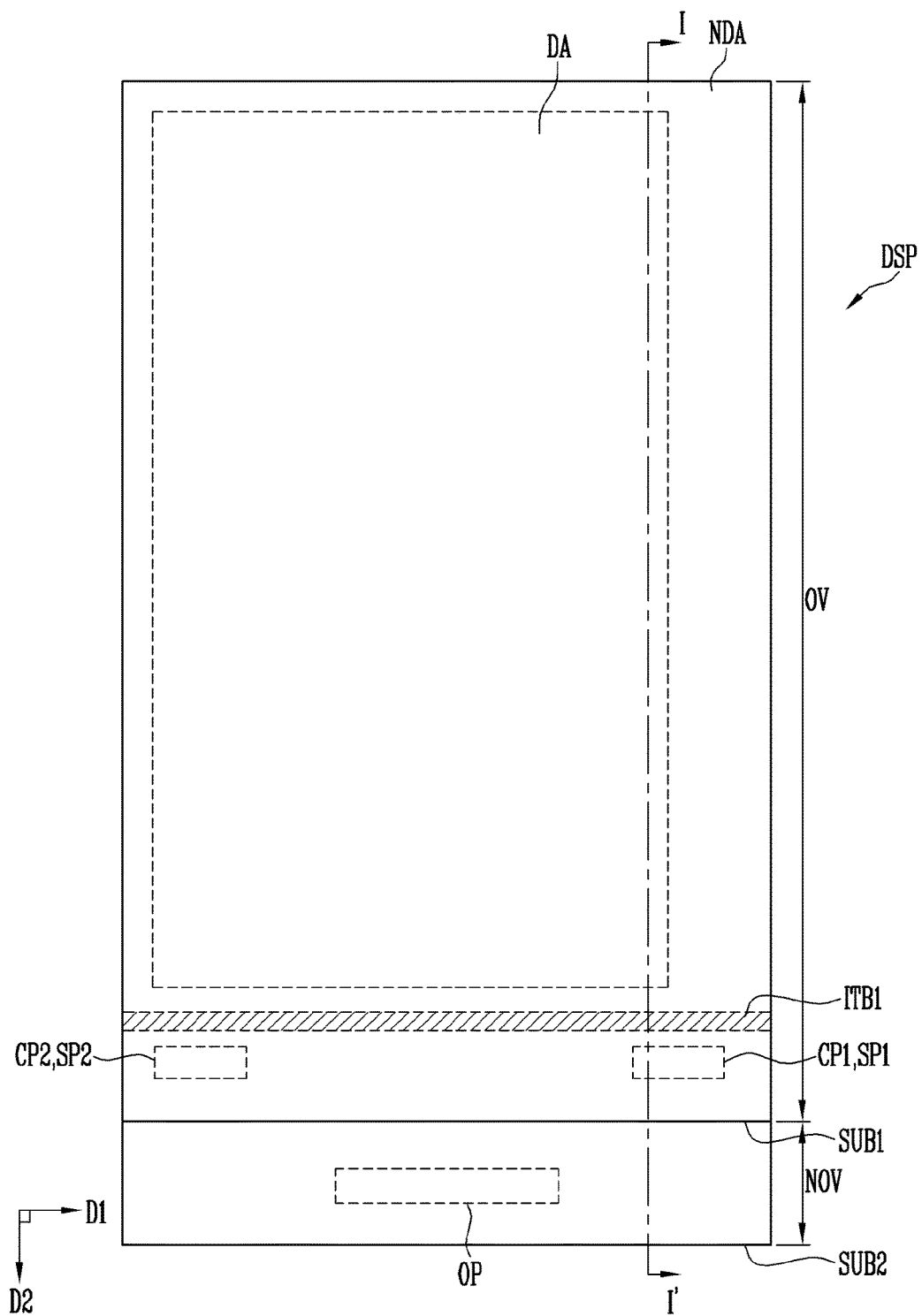
FIG. 1 is a plan view illustrating a display device according to an embodiment.

While embodiments are described with reference to the accompanying drawings, it is to be understood that various changes and modifications can be made in the described technology without departing from the spirit and scope thereof. Further, it should be understood that the described technology is not limited to the specific embodiments thereof, and various changes, equivalences and substitutions can be made without departing from the scope and spirit of the described technology.

Like reference numerals designate like elements throughout the drawings. In the drawings, the dimension of elements can be exaggerated for the clarity of this described technology. Although terms "first", "second", etc. are used herein to describe various elements, these elements should not be limited by these terms. These terms are only used to distinguish one element from another element. For example, the first element can be designated as the second element without departing from the scope of the described technology. Similarly, the second element can be designated as the first element. Further, the singular forms "a" and "an" include plural referents unless the context clearly dictates otherwise.

Herein, it should be understood that terms "include" or "have" are inclusive of characteristics, numerals, steps, operations, elements, parts or combination thereof, but are not exclusive of one or more different characteristics, numerals, steps, operations, elements, parts or combination thereof. Also, when an element, such as a layer, a film, a region or a plate, is referred to as being "under" another element, it can be right under the another element or be under the another element with one or more intervening elements interposed therebetween. In this disclosure, the term "substantially" includes the meanings of completely, almost completely or to any significant degree under some applications and in accordance with those skilled in the art. Moreover, "formed on" can also mean "formed over." The term "connected" includes an electrical connection.

Hereinafter, embodiments will be described in detail with reference to the accompanying drawings.

Figure 2:
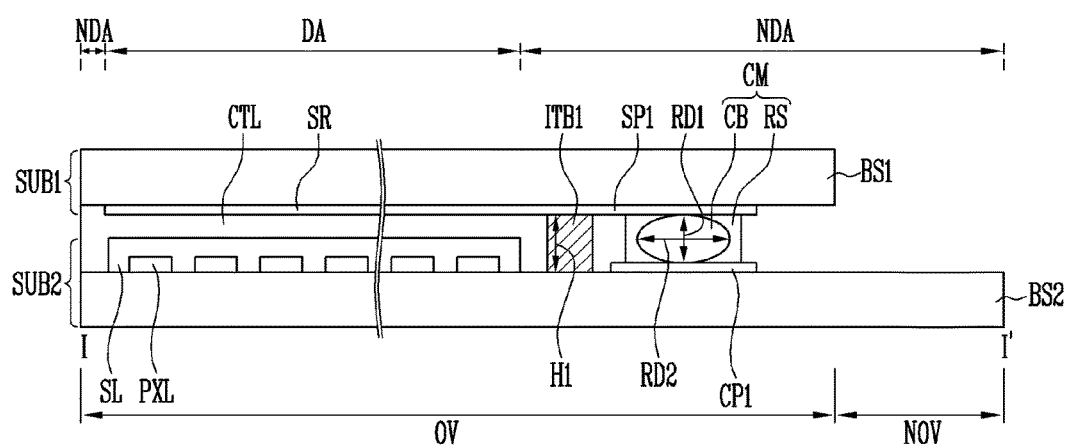
FIG. 2 is a sectional view taken along line I-I' of FIG. 1.
Figure 3:
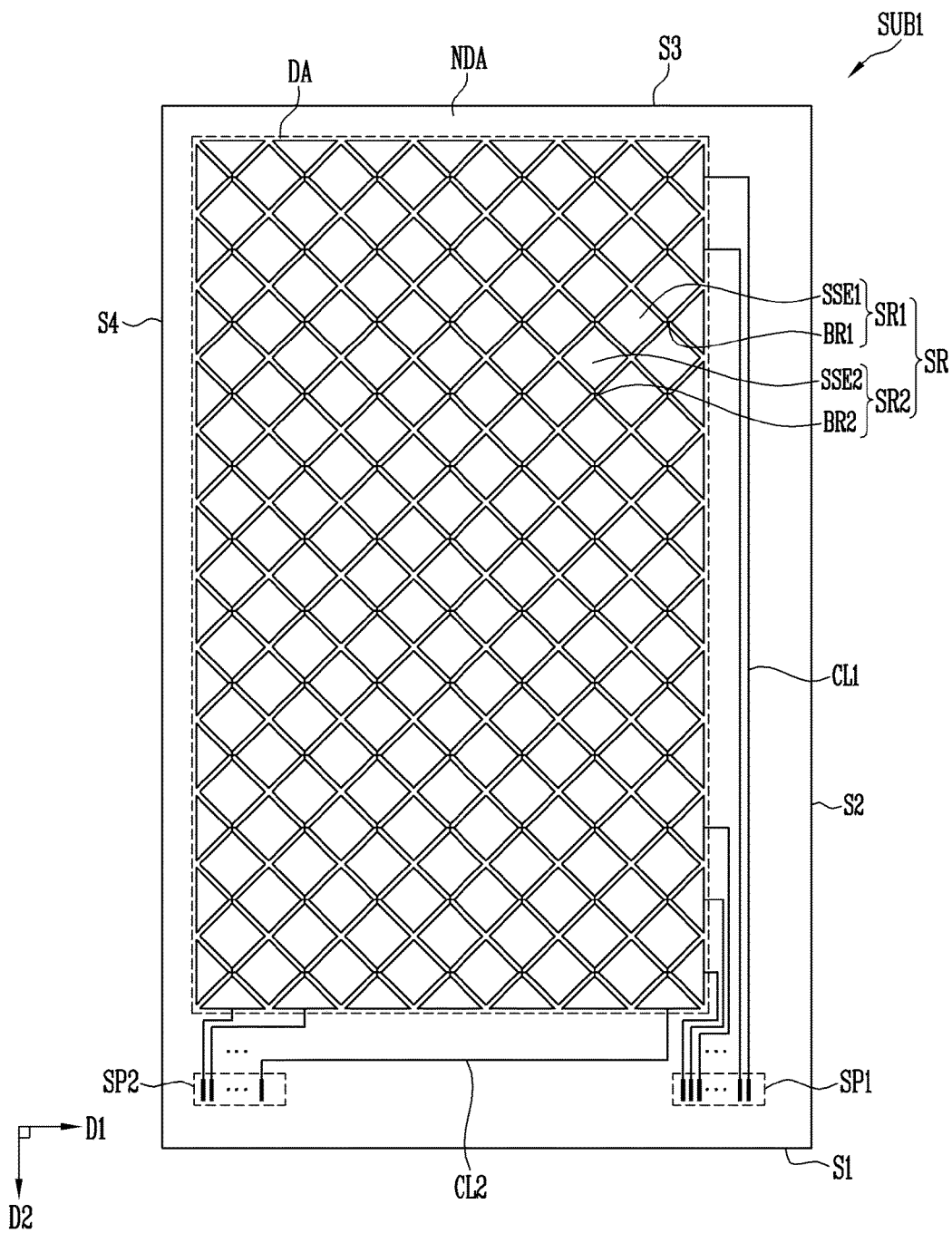
FIG. 3 is a plan view illustrating a first substrate of FIG. 1.

FIG. 1 is a plan view illustrating a display device DSP according to an embodiment. FIG. 2 is a cross-sectional view taken along the line I-I' of FIG. 1. FIG. 3 is a plan view illustrating a first substrate SUB1 shown in FIG. 1. FIG. 4 is a plan view illustrating a second substrate SUB2 shown in FIG. 1.

Referring to FIGS. 1 to 4, the display device DSP can include a display area DA and a non-display area NDA provided adjacent to the display area DA.

An image can be displayed in the display area DA, and the image can include arbitrary visual information, for example, test, videos, pictures, and two-dimensional or three-dimensional images.

The non-display area NDA can be provided around the display area DA. According to an embodiment, the non-display area NDA can be formed at at least one side of the display area DA, or can be formed around the display area DA. Pad parts can be formed in the non-display area NDA so as to provide pads of metal lines. The pad parts can be formed at one side of the display area DA. The pad parts can include a touch sensor pad part, a connection pad part and a driving pad part to be described below. The shape of the display region NDA can vary depending on shapes of the touch sensor pad part, the connection pad part and the driving pad part.

The display device DSP can include a first substrate SUB1, a second substrate SUB2, and an interlayer CTL, conductive members CM, and an inter-bar ITB (denoted by "ITB1" in the drawings) interposed between the first substrate SUB1 and the second substrate SUB2.

The first substrate SUB1 and the second substrate SUB2 can have various shapes, for example, a rectangular plate having two pairs of parallel sides. When the display device DSP is in the shape of a rectangular plate, one of the two pairs of sides can be longer than the other pair. According to an embodiment, for the convenience of explanation, the display device DSP can have a rectangular shape having a pair of long sides and a pair of short sides. A direction in which the short sides extend can be a first direction D1, and a direction in which the long sides extend can be a second direction D2. For the convenience of explanation, one of the short sides of the display device DSP can be referred to as a first side S1 and the other three sequentially connected sides of the first substrate SUB1 can be referred to as second, third, and fourth sides S2, S3, and S4.

According to an embodiment, the first substrate SUB1 has a smaller area than the second substrate SUB2. The second substrate SUB2 can include an overlapping portion OV overlapping the first substrate SUB1 and a non-overlapping portion NOV not overlapping the first substrate SUB1 as viewed in plan view.

According to an embodiment, the first side of the first substrate SUB1 and the first side of the second substrate SUB2 do not coincide with each other as viewed in plan view. According to an embodiment, the first substrate SUB1 has the same length as the second substrate SUB2 on the basis of the first direction D1 and a smaller length than the second substrate SUB2 on the basis of the second direction D2. Therefore, the non-overlapping portion NOV can be provided between the first side S1 of the first substrate SUB1 and a corresponding side of the second substrate SUB2. As viewed in plan view, the first substrate SUB1 and the second substrate SUB2 can have the second, third and fourth sides S2, S3, and S4 that are substantially the same as each other.

The first side S1 of the first substrate SUB1 can have the same shape as a side of the second substrate SUB2 that corresponds thereto. For example, the first side S1 of the first substrate SUB1 and the corresponding side of the second substrate SUB2 have a linear shape extending in the first direction D1.

According to an embodiment, the display area DA and a portion of the non-display area NDA is provided in the overlapping portion OV. Another portion of the non-display area NDA can be provided in the non-overlapping portion NOV.

The non-overlapping portion NOV can be provided as a place where a flexible printed circuit board is attached so as to be connected to an external driver (e.g., a place where a driving pad part OP to be described below is provided). According to an embodiment, though not illustrated, a testing pad part can be further provided on an upper surface of the non-overlapping portion NOV of the second substrate SUB2 so as to test whether the pixels or other components are defective.

Though not shown, according to another embodiment, the first side S1 of the first substrate SUB1 can have a different shape from the corresponding side of the second substrate SUB2. The shape of the first side S1 of the first substrate SUB1 can change depending on the type and arrangement of a pad part.

The first substrate SUB1 can include a first base substrate BS1, a touch sensor SR provided on the first base substrate BS1, connection lines connected to the touch sensor SR, and a touch sensor pad part provided at end portions of the connection lines.

The first base substrate BS1 can include an insulating material having flexibility. For example, the first base substrate BS1 is formed of various materials such as glass, polymers, and metals. The first base substrate BS1 can be an insulating substrate including an organic polymer. Examples of the insulating material including the organic polymer for the first base substrate BS1 can include, but not limited to, polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, cellulose triacetate, and cellulose acetate propionate. For example, the first base substrate BS1 includes fiber glass reinforced plastic (FRP).

The touch sensor SR can sense a user's touch and/or a pressure of a touch when a user touches the display device DSP, and be provided in the display area DA of the first substrate SUB1. The touch sensor SR can be a mutual capacitance touch sensor that senses changes in capacitance by interactions between two types of sensing electrodes.

The touch sensor SR can include a plurality of first sensing units SR1 and a plurality of second sensing units SR2. The first sensing units SR1 can extend in the first direction D1 and a sensing voltage can be applied thereto. The second sensing units SR2 can extend in a different direction from the first direction D1, e.g., in the second direction D2 crossing the first direction D1. The first sensing units SR1 can be capacitively coupled to the second sensing units SR2, and such capacitive coupling can change a voltage.

The first sensing units SR1 can include a plurality of first sensing electrodes SSE1 arranged in the first direction D1 and a plurality of first bridges BR1 connecting adjacent first sensing electrodes SSE1 to each other. The first sensing electrodes SSE1 can have various shapes, such as a bar or a polygon including a rhombus.

According to an embodiment, the first sensing electrodes SSE1 and the first bridges BR1 are arranged in a single plate shape or a mesh shape including fine lines.

The second sensing units SR2 can include a plurality of second sensing electrodes SSE2 arranged in the second direction D2 and a plurality of second bridges BR2 connecting adjacent second sensing electrodes SSE2. The second sensing electrodes SSE2 can also have various shapes, such as a bar or a polygon including a rhombus.

The second sensing electrodes SSE2 and the second bridge BR2 can also have a single plate shape or a mesh shape including fine lines.

The first sensing electrodes SSE1 and the second sensing electrodes SSE2 can be alternately arranged in a matrix format on the first base substrate BS1.

The first sensing units SR1 and the second sensing units SR2 can be electrically insulated from each other. For example, as illustrated in FIG. 3, the first bridges BR1 and the second bridges BR2 can cross each other. However, actually, the first bridges BR1 and the second bridges BR2 can be insulated from each other with an insulating layer interposed therebetween. The first sensing units SR1 and the second sensing units SR2 can be, but not limited to, provided at different layers. According to an embodiment, the first sensing electrodes SSE1 and the second sensing electrodes SSE2 are provided on the same layer, and the first bridges BR1 and the second bridges BR2 are provided on different layers.

Connection lines CL1 and CL2 (hereinafter, "CL") can be provided in the non-display area NDA so as to connect the touch sensor SR to a driver (not illustrated) configured to drive the touch sensor SR. The driver can be provided on the second substrate SUB2 to be described below, or on an external device, such as a separate printed circuit board, and include a position detecting circuit. The connection lines CL can transmit a sensing input signal from the driver to the first sensing units SR1 and the second sensing units SR2, or transmit sensing output signals from the first sensing units SR1 and the second sensing units SR2 to the driver.

According to an embodiment, the connection lines CL includes a plurality of first connection lines CL1 and a plurality of second connection lines CL2. The first connection lines CL1 can be connected to the first sensing units SR1. Each of the first connection lines CL1 can be connected to a column corresponding to the first sensing units SR1. The first connection lines CL1 can be bent a plurality of times in the non-display area NDA as viewed in plan view.

The second connection lines CL2 can be connected to the second sensing units SR2. Each of the second connection lines CL2 can be connected to a row corresponding to the second sensing units SR2. The second connection lines CL2 can be bent a plurality of times in the non-display area NDA as viewed in plan view.

Touch sensor pad parts SP1 and SP2 (hereinafter, "SP") can be provided between the touch sensor SR and the driver to transmit a signal to or from the driver. The touch sensor pad part SP can be provided in the non-display area NDA and connected to end portions of the connection lines CL. The touch sensor pad part SP can include a plurality of touch sensor pads provided at end portions of the connection lines CL. The touch sensor pad part SP can be electrically connected to connection pad parts CP1 and CP2 (hereinafter, "CP") of the second substrate SUB2 to be described below through conductive members to be described below. The touch sensor SR can be coupled to the connection lines CL, the touch sensor pad part SP can be connected to the end portions of the connection lines CL, the touch sensor pad part SP can be coupled to the connection pad part CP through conductive members, and the connection pad part CP can be finally connected to the driver through the driving pad part OP to be described below. As a result, signals relating to a touch can be mutually transmitted from the driver to the touch sensor.

The touch sensor pad part SP can be provided in the non-display area NDA adjacent to at least one of the four sides of the first substrate SUB1. According to an embodiment, it is illustrated that the touch sensor pad part SP is provided in the non-display area NDA adjacent to the first side S1.

The touch sensor pad part SP can include a first touch sensor pad part SP1 provided at end portions of the first connection lines CL1 and a second touch sensor pad part SP2 provided at end portions of the second connection lines CL2. The first touch sensor pad part SP1 and the second touch sensor pad part SP2 can be provided adjacent to and spaced apart from each other as viewed in plan view. According to an embodiment, the first touch sensor pad part SP1 and the second touch sensor pad part SP2 are provided at both sides of the first substrate SUB1, respectively, in the first direction D1, and spaced part from each other.

According to an embodiment, the touch sensor SR, the connection lines CL, and the touch sensor pad part SP can include conductive materials. Examples of the conductive materials can include metals, alloys thereof, conductive polymers, conductive metal oxides, and nano-conductive materials. According to an embodiment, examples of the metals can include copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, and lead. Examples of the conductive polymers can include polythiophene-based compounds, polypyrrole-based compounds, polyaniline-based compounds, polyacetylene-based compounds, polyphenylene-based compounds, and mixtures thereof. For example, PEDOT/PSS compounds, among polythiophene-based compounds, can be used. Examples of the conductive metal oxides can include indium tin oxide (ITO), indium zinc oxide (IZO), antimony zinc oxide (AZO), indium tin zinc oxide (ITZO), zinc oxide (ZnO), and tin oxide (SnO2). Examples of the nano-conductive compounds can include silver nanowires, carbon nanotubes, and graphene.

The second substrate SUB2 can oppose the first substrate SUB1 to display an image.

The second substrate SUB2 can include a second base substrate BS2, pixels PXL provided on the second base substrate BS2, a sealing layer SL covering the pixels PXL, signal lines SGL connected to the pixels PXL, the driving pad part OP provided at end portions of the signal lines SGL, and the connection pad part CP corresponding to the touch sensor pad parts SP.

The second base substrate BS2 can have substantially the same shape as the first base substrate BS1. The second base substrate BS2 can have an area greater than or equal to the first base substrate BS1.

The pixels PXL can include a plurality of pixels provided on the display area DA to form an image.

Figure 5A:
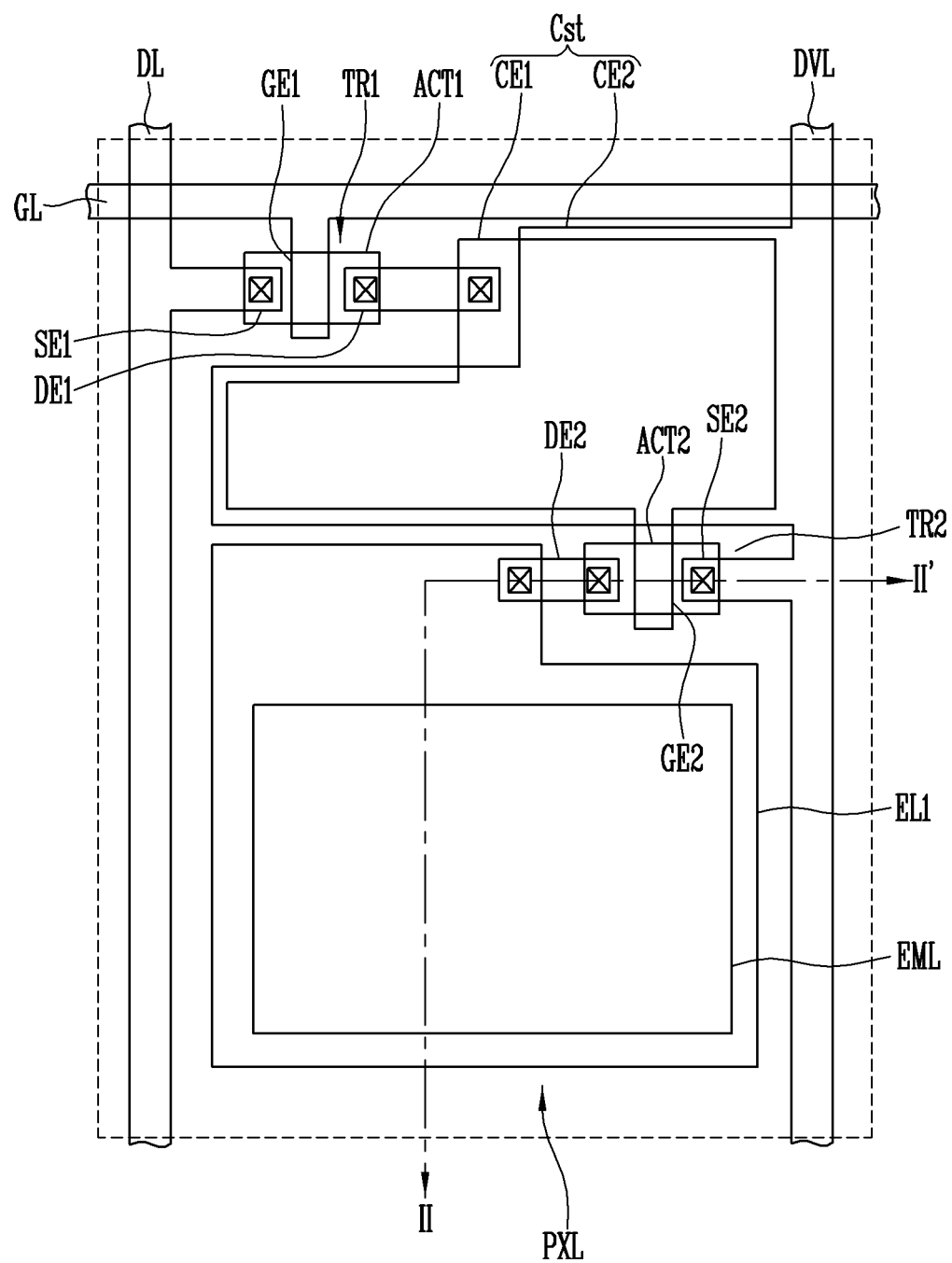
FIG. 5A is a plan view illustrating one pixel.
Figure 5B:
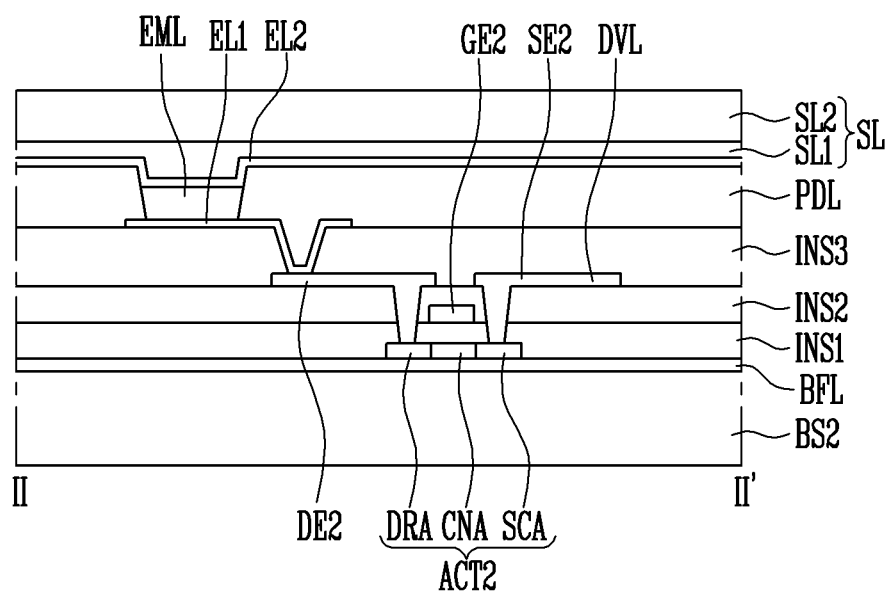
FIG. 5B is a sectional view taken along line II-II' of FIG. 5A.

FIG. 5A is a plan view illustrating a single pixel, and FIG. 5B is a cross-sectional view taken along line II-II' of FIG. 5A.

Referring to FIGS. 4, 5A and 5B, the pixels PXL can be connected to the signal lines SGL. The signal lines SGL can apply signals to the respective pixels PXL and include a gate line GL, a data line DL, a driving voltage line DVL, and other metal lines as necessary.

The gate line GL can extend in one of the first direction D1 and the second direction D2. The data line DL can extend in a direction crossing the gate line GL. The driving voltage line DVL can extend in substantially the same direction as the data line DL. The gate line GL can transfer a scan signal to the thin film transistor, the data line DL can transfer a data signal to the thin film transistor, and the driving voltage line DVL can provide a driving voltage to the thin film transistor.

A plurality of the gate lines GL, a plurality of the data lines DL, and a plurality of the driving voltage lines DVL can be provided.

Each of the signal lines SGL can be provided across the display area DA and the non-display area NDA.

The pixel PXL can display an image and be provided in the display area DA. A plurality of the pixels PXL can be provided and arranged in a matrix format. According to an embodiment, for convenience of explanation, FIGS. 5A and 5B illustrate a single pixel PXL. It is illustrated that the pixel PXL has, but not limited to, a rectangular shape. The pixel PXL can have various shapes. In addition, the pixels PXL can have different areas from each other. For example, the pixels PXL in different colors can have different areas or shapes according to colors.

Each of the pixels PXL can include a thin film transistor connected to a corresponding signal line, among the signal lines SGL, a light emitting device connected to the thin film transistor, and a capacitor Cst.

The thin film transistor can include a driving thin film transistor TR2 that controls the light emitting device and a switching thin film transistor TR1 that switches the driving thin film transistor TR2. According to an embodiment, one pixel PXL can include, but not limited to, two thin film transistors TR1 and TR2. Instead, one pixel PXL can include one thin film transistor and one capacitor, or one pixel PXL can include at least three thin film transistors and at least two capacitors.

The switching thin film transistor TR1 can include a first gate electrode GE1, a first source electrode SE1, and a first drain electrode DE1. The first gate electrode GE1 can be connected to the gate line GL, and the first source electrode SE1 can be connected to the data line DL. The first drain electrode DE1 can be connected to a gate electrode (i.e., second gate electrode GE2) of the driving thin film transistor TR2. The switching thin film transistor TR1 can transfer the data signal applied to the data line DL to the driving thin film transistor TR2 in response to the scan signal applied to the gate line GL.

The driving thin film transistor TR2 can include a second gate electrode GE2, a second source electrode SE2, and a second drain electrode DE2. The second gate electrode GE2 can be connected to the switching thin film transistor TR1, the second source electrode SE2 can be connected to the driving voltage line DVL, and the second drain electrode DE2 can be connected to the light emitting device.

The light emitting device can include an emitting layer EML, and a first electrode EL1 and a second electrode EL2 opposing each other with the emitting layer EML interposed therebetween. The first electrode EL1 can be connected to the second drain electrode DE2 of the driving thin film transistor TR2. A common voltage can be applied to the second electrode EL2, and the emitting layer EML can emit light in response to a signal output from the driving thin film transistor TR2, or display an image without emitting light. The light emitted from the emitting layer EML can change depending on the material of the emitting layer. The light can be color light or white light.

According to an embodiment, the emitting layer EML has various configurations in a region where each pixel PXL is provided. According to an embodiment, it is illustrated that the emitting layer EML does not overlap the thin film transistor. However, the emitting layer EML can overlap some, or most of the thin film transistors. The shape or area of the region where the light emitting device is provided in the region where the pixel PXL is provided can vary depending on a direction in which an image is output from the display device.

The capacitor Cst can be connected between the second gate electrode GE2 and the second source electrode SE2 of the driving thin film transistor TR2, and charge and maintain a data signal input to the second gate electrode GE2 of the driving thin film transistor TR2.

Hereinafter, a pixel according to an embodiment is described according to a stacking order.

A pixel according to an embodiment can be provided on the second base substrate BS2.

A buffer layer BFL can be formed on the second base substrate BS2. The buffer layer BFL can prevent diffusion of impurities into the switching and driving thin film transistors TR1 and TR2. The buffer layer BFL can include silicon nitride (SiNx), silicon oxide (SiOx) and silicon oxynitride (SiOxNy). The buffer layer BFL can be omitted depending on the material and processing conditions of the base substrate BS.

A first active pattern ACT1 and a second active pattern ACT2 can be provided on the buffer layer BFL. The first active pattern ACT1 and the second active pattern ACT2 can include semiconductor materials. Each of the first active pattern ACT1 and the second active pattern ACT2 can include a source region SCA, a drain region DRA, and a channel region CAN provided between the source region SCA and the drain region DRA. Each of the first active pattern ACT1 and the second active pattern ACT2 can be a semiconductor pattern including polysilicon, amorphous silicon, and oxide semiconductor. The channel region CAN can be a semiconductor pattern not doped with impurities, and be an intrinsic semiconductor. Each of the source region SCA and the drain region DRA can be semiconductor patterns doped with impurities. For example, the semiconductor patterns is doped with n type impurities, p type impurities, and other metals.

A first insulating layer INS1 can be provided on the first active pattern ACT1 and the second active pattern ACT2.

The first gate electrode GE1 connected to the gate line GL and the second gate electrode GE2 can be provided on the first insulating layer INS1. The first gate electrode GE1 and the second gate electrode GE2 can cover regions corresponding to the channel regions CAN of the first active pattern ACT1 and the second active pattern ACT2, respectively.

A second insulating layer INS2 can be provided on the first and second gate electrodes GE1 and GE2 to cover the first and second gate electrodes GE1 and GE2.

The first source electrode SE1, the first drain electrode DE1, the second source electrode SE2 and the second drain electrode DE2 can be provided on the second insulating layer INS2. The first source electrode SE1 and the first drain electrode DE1 can contact the source region SCA and the drain region DRA of the first active pattern ACT1, respectively, through contact holes formed in the first insulating layer INS1 and the second insulating layer INS2. The second source electrode SE2 and the second drain electrode DE2 can contact the source region SCA and the drain region DRA of the second active pattern ACT2, respectively, through contact holes formed in the first insulating layer INS1 and the second insulating layer INS2.

A portion of the second gate electrode GE2 and a portion of the driving voltage line DVL can be the first capacitor electrode CE1 and the second capacitor electrode CE2, respectively, and form the capacitor Cst with the second insulating layer INS2 interposed therebetween.

A third insulating layer INS3 can be provided on the first source electrode SE1, the first drain electrode DE1, the second source electrode SE2 and the second drain electrode DE2. The third insulating layer INS3 can serve as a protective layer for protecting the switching and driving thin film transistors TR1 and TR2, or as a planarizing surface for planarizing an upper surface thereof.

The first electrode EL1 can be provided as an anode of the light emitting device on the third insulating layer INS3. The first electrode EL1 can be connected to the second drain electrode DE2 of the driving thin film transistor TR2 through a contact hole formed in the third insulating layer INS3. The first electrode EL1 can also serve as a cathode. However, hereinafter, the first electrode EL1 serving as an anode is described.

The first electrode EL1 can include a material having a high work function. In FIGS. 4, 5A and 5B, when an image is to be provided in a downward direction of the base substrate BS, the first electrode EL1 can include a transparent conductive layer, such as an indium tin oxide (ITO), indium zinc oxide (IZO), zinc oxide (ZnO), and indium tin zinc oxide (ITZO). In FIGS. 4, 5A and 5B, when an image is to be provided in an upward direction of the base substrate BS, the first electrode EL1 can include a metal reflective layer including metals, such as Ag, Mg, Al, Pt, Pd, Au, Ni, Nd, Ir, and Cr, and a transparent conductive layer, such as indium tin oxide (ITO), indium zinc oxide (IZO), zinc oxide (ZnO), and indium tin zinc oxide (ITZO).

A pixel defining layer PDL can be provided on the second base substrate BS2 on which the first electrode EL1 is formed so that the pixel defining layer PDL can divide a pixel area at corresponding to each pixel PXL. The pixel defining layer PDL can expose an upper surface of the first electrode EL1 and protrude from the base substrate BS along the periphery of each pixel PXL.

The emitting layer EML can be provided in the pixel area surrounded by the pixel defining layer PDL, and the second electrode EL2 can be provided on the emitting layer EML.

The sealing layer SL can be provided on the second electrode EL2 to cover the second electrode EL2. The sealing layer SL can include a single layer, or a plurality of layers. According to an embodiment, the sealing layer SL can include a first sealing layer SL1 and a second sealing layer SL2 including different materials from each other. For example, the first sealing layer SL1 can include an organic material, and the second sealing layer SL2 can include an inorganic material. However, the number of layers or materials forming the sealing layer SL are not limited thereto. For example, the sealing layer SL can include a plurality of organic material layers and a plurality of inorganic material layers stacked alternately with each other.

Referring again to FIGS. 1 to 4 and 5A and 5B, the connection pad part CP is provided at a position corresponding to the touch sensor pad part SP of the first substrate SUB1 in the non-display area NDA, and have substantially the same shape as the touch sensor pad parts SP. The connection pad part CP can overlap the touch sensor pad part SP as viewed in plan view. The connection pad part CP can include connecting pads each of which corresponds to each of the touch sensor pads of the touch sensor pad parts SP. The connection pad part CP can be provided to transmit a signal from or to the driver and electrically connected to the touch sensor pad part SP of the first substrate SUB1 through conductive members CM to be described below.

The connection pad part CP can include a first connection pad part CP1 corresponding to the first touch sensor pad part SP1 and a second connection pad part CP2 corresponding to the second touch sensor pad part SP2.

Additional connection lines can be connected to the connection pad part CP. A third connection line CL3 can be connected to the first connection pad part CP1, and a fourth connection line CL4 can be connected to the second connection pad part CP2.

The signal lines SGL can be connected to the pixels PXL. The signal lines SGL can supply image-related signals to the pixels PXL. For example, the gate line GL can transfer a scan signal from the driver to the thin film transistor, the data line DL can transfer a data signal to the thin film transistor, and the driving voltage line DVL can provide a driving voltage to the thin film transistor. Though not illustrated, the signal lines can additionally include various lines for displaying an image, and various signals can be applied to the respective signal lines.

The driving pad part OP can be provided in the non-display area NDA and connected to end portions of the signal lines SGL and the additional connection lines, i.e., the third connection line CL3 and the fourth connection line CL4. The driving pad part OP can include a plurality of driving pads provided at the end portions of the signal lines SGL. The driving pad part OP can be provided to transmit a signal to the driver, or transmit t signals from the driver to the pixels PXL and the connection pad part CP.

The driving pad part OP can be provided in the non-display area NDA adjacent to at least one of the four sides of the second substrate SUB2. For example, the driving pad part OP is provided in a region of the second substrate SUB2 that does not overlap the first substrate SUB1.

Though not illustrated, the driving pad part OP can be connected to another component, for example, a flexible printed circuit board with a separate conductive member interposed therebetween.

The connection pad parts CP, the signal lines SGL, the additional connection lines, and the driving pad part OP can include conductive materials. Examples of the conductive materials can include metals, alloys thereof, conductive polymers, conductive metal oxides, and nano-conductive materials. According to an embodiment, examples of the metals can include copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, and lead. Examples of the conductive polymers can include polythiophene-based compounds, polypyrrole-based compounds, polyaniline-based compounds, polyacetylene-based compounds, polyphenylene-based compounds and mixtures thereof. For example, PEDOT/PSS compounds, among polythiophene-based compounds, can be used. Examples of the conductive metal oxides can include indium tin oxide (ITO), indium zinc oxide (IZO), antimony zinc oxide (AZO), indium tin zinc oxide (ITZO), zinc oxide (ZnO), and tin oxide (SnO2). Examples of the nano-conductive compounds can include silver nanowires, carbon nanotubes, and graphene.

The connection pad parts CP, the signal lines SGL, the additional connection lines, and the driving pad part OP can be manufactured at the same time as forming the above-described pixels PXL.

As described above, the display device DSP according to the embodiment can include the first substrate SUB1, the second substrate SUB2, and the interlayer CTL, the conductive members CM and the inter-bar ITB provided between the first substrate SUB1 and the second substrate SUB2.

The interlayer CTL can be provided in the display area DA between the first substrate SUB1 and the second substrate SUB2.

The interlayer CTL can protect the touch sensor SR of the first substrate SUB1 and serve to attach the first substrate SUB1 and the second substrate SUB2 to each other. Thus, the interlayer CTL can be sticky or adhesive to attach the first and second substrates to each other.

The interlayer CTL can include a transparent material to transmit an image from the second substrate SUB2. In addition, the interlayer CTL can include an insulating material and have flexibility.

The interlayer CTL can include any type of material that can protect the touch sensor of the first substrate and attaching the first substrate and the second substrate to each other. According to an embodiment, the interlayer CTL can include an organic material. The organic material can be photocurable or thermosetting and be selected from various organic polymer materials. For example, the organic material can include an acrylic acid ester polymer. Alternatively, the organic material can include an epoxy resin. Examples of the epoxy resin can include a bisphenol A type epoxy resin, a bisphenol F type epoxy resin, a bisphenol AD type epoxy resin, a bisphenol S type epoxy resin, a xylenol type epoxy resin, a phenol novolak type epoxy resin, a cresol novolak type epoxy resin, a multifunctional type epoxy resin, a tetraphenyl methane type epoxy resin, a polyethylene glycol type epoxy resin, a polypropylene glycol type epoxy resin, a hexanediol type epoxy resin, a trimethylolpropane type epoxy resin, a propylene oxide bisphenol A type epoxy resin, or mixtures thereof.

The interlayer CTL can be provided in the display area DA and extend to the non-display area NDA adjacent to the display area DA. For example, a side surface of the interlayer CTL that corresponds to at least one of the second, third and fourth side S2, S3, and S4 can be exposed to the outside. For example, another component is not provided outside the interlayer CTL, and side surfaces of the interlayer CTL can be arranged in the outermost region. Thus, the side surfaces of the interlayer CTL can be exposed to the outside on the second, third, and fourth sides S2, S3, and S4 of the first substrate SUB1, except the first side S1 thereof.

The side surface of the interlayer CTL that corresponds to the first side S1 of the first substrate SUB1 can contact the inter-bar ITB to be described below. This will be described below.

The conductive member CM can be provided between the first substrate SUB1 and the second substrate SUB2 and connect the touch sensor pad part SP of the first substrate SUB1 to the connection pad part CP of the second substrate SUB2. The conductive member CM can be formed in the region where the touch sensor pad part SP and the connection pad part CP are formed as viewed in plan view. Therefore, the conductive member CM can overlap the touch sensor pad part SP and the connection pad part CP.

The conductive member CM can include a plurality of conductive balls CB and insulators RS surrounding the conductive balls CB.

The conductive balls CB can be formed of any material allowing an electrical connection. According to an embodiment, the conductive balls CB can be formed of metals, such as nickel, iron, copper, aluminum, tin, zinc, chromium, cobalt, silver, gold, and antimony; compounds including these metals; oxides of these metals; solder; or conductive particles. According to another embodiment, the conductive balls CB can be particles forming a thin metal layer on a surface of a core material, such as glass, ceramics, and polymers, by using a method of forming a thin layer, such as electroless plating. Examples of the polymers can include organic polymers, such as various types of epoxy resins. According to an embodiment, a bisphenol-F epoxy resin can be used as the epoxy resin. Alternatively, the conductive balls CB can include the conductive particles, or use particles formed by coating surfaces of particles having a thin metal layer formed on the surface of a core material with an insulating insulator as conductive particles.

The insulator RS can include any material that is adhesive and firmly attaches the touch sensor pad part SP and the connection pad part CP. According to an embodiment, the insulator RS can include a rubber-based resin and/or a polymer resin. Examples of the polymer resin can include a thermoplastic polymer resin, a thermosetting polymer resin, and a radical polymerizable polymer resin.

Examples of the thermoplastic polymer resin can include acrylate-based resins, such as a styrene-butadiene resin, an ethylene vinyl resin, an ester-based resin, a silicon resin, a phenoxy resin, an acrylic resin, an amide-based resin, an acrylate-based resin, and a polyvinyl butyral resin. Examples of the thermosetting resin can include an epoxy resin, a phenolic resin and a melamine resin. Examples of the radical polymerizable polymer resin can include methyl acrylate, ethyl acrylate, bisphenol A modified ethylene glycol diacrylate, isocyanuric acid ethylene modified ethylene glycol diacrylate, tripropylene glycol diacrylate, tetraethylene glycol diacrylate, polyethylene glycol diacrylate, pentaerythritol triacrylate, trimethylolpropane triacrylate, trimethylolpropane propylene glycol triacrylate, trimethylolpropane ethylene glycol triacrylate, isocyanuric acid ethylene glycol-modified triacrylate, dipentaerythritol pentaacrylate, dipentaerythritol hexaacrylate, pentaerythritol tetraacrylate, dicyclopentenyl acrylate, and tricyclodecanyl acrylate; methacrylate-based resins; maleimide compounds; unsaturated polyester; acrylic acid; vinyl acetate; or acrylonitrile, methacrylonitrile compounds.

In the drawings, for convenience of explanation, only one conductive ball CB is illustrated. However, a plurality of the conductive balls CB can be provided in the conductive member CM.

Each of the conductive balls CB can have a circular or elliptical shape between the first substrate SUB1 and the second substrate SUB2. The conductive ball CB can have an elliptical shape between the touch sensor pads and the connecting pads that oppose each other. In other cases, the conductive ball CB has a substantially circular shape. Although the conductive ball CB has a circular shape, the shape of the conductive ball CB can change from a circle into an oval since the conductive ball CB is compressed in a vertical direction between the first substrate SUB1 and the second substrate SUB2. Since the distance between the touch sensor pads and the connecting pads facing each other is smaller than that between other portions, the conductive member CM between the touch sensor pads and the connecting pads can have a substantially elliptical shape according to the distance between the two substrates.

An average diameter of the conductive balls CB can have a varying value depending on the distance between the first substrate SUB1 and the second substrate SUB2 of a display device to be manufactured. In addition, the distance between the first substrate SUB1 and the second substrate SUB2 can be further reduced when another component, such as an insulating layer, is interposed between an upper surface of the first base substrate BS1 or the second base substrate BS2 and the conductive member CM. According to an embodiment, the average diameter of the conductive balls CB can be about 16 µm to about 24 µm. The "average diameter" can refer to an average of all diameters passing through the centers of the respective conductive balls. For example, when the conductive balls CB have an oval shape having a short side in a vertical direction between the first substrate SUB1 and the second substrate SUB2, if a diameter of the oval shape in the vertical direction is a first diameter RD1 and a diameter thereof in a horizontal direction is a second diameter RD2, the first diameter RD1 can be a short axis and be the shortest, the second diameter RD2 can be a long axis and be the longest, and the other diameters can refer to values between the long axis and the short axis.

Therefore, the average diameter of the conductive balls CB can be an average of the diameters. The average diameter of the conductive balls CB can be approximately a median of the first diameter RD1 and the second diameter RD2 and be substantially the same as a diameter of the circular shape of the conductive balls CB before being compressed.

The inter-bar ITB can be provided in the non-display area NDA between the first substrate SUB1 and the second substrate SUB2 so as to be adjacent to the connection pad part CP. To avoid confusion with other embodiments, an inter-bar in this embodiment can be referred to as a first inter-bar ITB1.

According to an embodiment, the first inter-bar ITB1 can be provided between the display area DA and the touch sensor pad part SP as viewed in plan view. For example, the first inter-bar ITB1 can be provided between the display area DA and the connection pad part CP.

The first inter-bar ITB1 can attach the first and second substrates SUB1 and SUB2 to each other and prevent the interlayer CTL from extending to the touch sensor pad part SP and the connection pad part CP. As viewed in plan view, the first inter-bar ITB1 can be provided between the interlayer CTL and the conductive member CM. A side surface of the first inter-bar ITB toward the display area DA can directly contact the interlayer CTL.

In addition, the first inter-bar ITB1 can be provided adjacent to the conductive member CM and stably attach the first substrate SUB1 and the second substrate SUB2 to prevent the conductive member CM from being detached from the first substrate SUB1 or the second substrate SUB2.

The first inter-bar ITB1 can correspond to the first side S1 and extend in the same direction as the first side S1. The first inter-bar ITB1 can be provided only at the first side S1. For example, the first inter-bar ITB1 is not provided at the second, third, and fourth sides S2, S3, and S4. According to an embodiment, the first inter-bar ITB1 can be formed in a single body along the first side S1 so that one end thereof can meet the fourth side S4 and the other end can meet the second side S2.

The first inter-bar ITB1 can include, but not limited to, an insulating material having adhesiveness. According to an embodiment, the first inter-bar ITB1 can include the above-described rubber-based resin and/or polymer resin.

According to an embodiment, a height H1 of the first inter-bar ITB1 can be smaller than the average diameter of the conductive balls CB. According to an embodiment, the average diameter of the conductive balls CB can be about 16 μm to about 24 μm, and the height H1 of the first inter-bar ITB1 can be about 10 μm to about 13 μm. In addition, according to an embodiment, the height H1 of the first inter-bar ITB1 can be about 50% to about 65% of the diameter of the conductive balls CB. There can be a difference of about 3 μm or more between the average diameter of the conductive balls CB and the height H1 of the first inter-bar ITB1.

The conductive balls CB can initially have a circular shape. However, the conductive balls CB can transform into an elliptical shape since the conductive balls CB are compressed in a vertical direction between the first substrate SUB1 and the second substrate SUB2 during a manufacturing process of a display device. After the conductive balls CB transform into the oval shape, the diameter in the vertical direction, for example, the length of the first diameter RD1 can have a substantially same as or similar value to the height H1 of the first inter-bar ITB1. Although there can be a difference between the first diameter RD1 and the height H1 of the first inter-bar ITB1, the difference can correspond to the thickness of the connection pad part CP and be slight unless a separate insulating layer is added.

According to an embodiment, the first inter-bar ITB1 can include spacers (not illustrated) and a binder (not illustrated) surrounding the spacers.

The spacers can have various shapes. According to an embodiment, the spacer can have a spherical shape, and be either inelastic or partially elastic. The spacers can enable the first substrate SUB1 and the second substrate SUB2 to keep a minimum distance therebetween when the first substrate SUB1 and the second substrate SUB2 are compressed against each other during the manufacturing process. A plurality of the spacers can be provided in the binder and have a diameter less than or equal to the entire height of the first inter-bar ITB1. According to an embodiment, the diameter of the spacer can be about 20% to about 30% of the average diameter of the conductive balls CB. For example, when the average diameter of the conductive balls CB is about 20 μm, the spacer can have a diameter of approximately 6 μm.

The spacer can include, but not limited to, a polymer material including a silicon oxide.

The display device including the above configuration can be manufactured by a method to be described below. FIGS. 6A to 6G are cross-sectional views sequentially illustrating a method of manufacturing a display device according to an embodiment.

Referring to FIGS. 1 to 4, and 6A, the first substrate SUB1 is manufactured. When the first substrate SUB1 is manufactured, the first base substrate BS1 can be prepared, and the touch sensor SR, the connection lines CL, and the touch sensor pad part SP can be formed on the first base substrate BS1.

To effectively form the touch sensor SR on the first base substrate BS1, a first carrier substrate CR1 can be provided under the first base substrate BS1 so as to support the first base substrate BS1.

The first base substrate BS1 can be manufactured by performing coating and hardening processes on the first carrier substrate CR1.

The touch sensor SR, the connection lines CL, and the touch sensor pad part SP can be formed on the first base substrate BS1 by various processes. For example, the touch sensor SR, the connection lines CL, and the touch sensor pad part SP can be formed using at least one photolithography process.

Referring to FIGS. 1 to 4, and 6B, the second substrate SUB2 is manufactured. When the second substrate SUB2 is manufactured, the pixels PXL, the sealing layer SL, the signal lines SGL, the driving pad part OP, and the connection pad part CP can be formed on the second base substrate BS2. To effectively form the pixels PXL on the second base substrate BS2, a second carrier substrate CR2 can be provided under the second base substrate BS2 to support the second base substrate BS2.

The pixels PXL can be formed by various processes, for example, by using a plurality of photolithography processes.

Referring to FIGS. 1 to 4, and 6C, the interlayer CTL can be provided over at least one of the first substrate SUB1 and the second substrate SUB2. According to an embodiment, the interlayer CTL can be formed on the first substrate SUB1. However, according to another embodiment, the interlayer CTL can be formed on the second substrate SUB2.

In addition, the interlayer CTL can be formed on the first substrate SUB1 by using various methods, for example, one of a printing method, a coating method and a dispensing method. For example, the interlayer CTL is formed by one of printing methods, such as screen printing, inkjet printing and nozzle printing; coating methods, such as slit coating, spin coating and spray coating; and a dispensing method. According to an embodiment, when the interlayer is formed by the screen printing method, the interlayer can be printed into a planar shape.

According to an embodiment, the interlayer CTL can be provided to the display area DA of the first substrate SUB1 while not being cured. In some embodiments, the region where the interlayer CTL is formed does not match exactly with the display area DA as viewed in plan view. The interlayer CTL can be formed by considering that the interlayer CTL is likely to spread outwards when being formed.

Subsequently, the interlayer CTL can be semi-cured. The semi-curing process can be performed so that interlayer CTL can have appropriate elasticity and flowability.

Referring to FIGS. 1 to 4, and 6D, the conductive member CM and the first inter-bar ITB1 can be formed in the non-display area NDA of the first substrate SUB1 on which the interlayer CTL is formed. According to an embodiment, the conductive member CM and the first inter-bar ITB1 can be formed on the first substrate SUB1. However, when the interlayer CTL is formed on the second substrate SUB2, the conductive member CM and the first inter-bar ITB1 can also be formed on the second substrate SUB2. In some embodiments, the order in which the conductive member CM and the first inter-bar ITB1 are formed is not particularly determined. The conductive member CM and the first inter-bar ITB1 can be formed at the same time.

According to an embodiment, the conductive member CM can be formed by coating the first substrate SUB1 with the insulator RS including the conductive balls CB and having predetermined flowability since the insulator RS is not cured or semi-cured. The conductive member CM can be formed by a screen printing method or a dispensing method using a dispenser. According to an embodiment, when the conductive member CM is formed using a dispenser, the insulator RS including the conductive balls CB can be discharged by moving the dispenser from one side of the touch sensor pad part SP to the other side thereof. A discharge start point and a discharge end point of the dispenser can be disposed outside the touch sensor pad part SP as viewed in plan view.

A diameter of each conductive ball CB of the conductive member CM can vary depending on the distance between the first substrate SUB1 and the second substrate SUB2. According to an embodiment, each conductive ball CB provided on the first substrate SUB1 can have a substantially circular shape and a diameter ranging from about 16 µm to about 24 µm.

The first inter-bar ITB1 can be formed at the first side S1 of the first substrate SUB1. For example, the first inter-bar ITB1 can be formed between the display area DA and the touch sensor pad parts SP, but not at the second, third, and fourth sides S2, S3, and S4.

The first inter-bar ITB1 can be formed to prevent the interlayer CTL from flowing toward the touch sensor pad part SP when the interlayer CTL is cured. In addition, the first inter-bar ITB1 can be formed to improve adhesion between the first substrate SUB1 and the second substrate SUB2.

The first inter-bar ITB1 can be formed by coating the first substrate SUB1 with an insulator having predetermined flowability since the insulator is not cured or semi-cured. The first inter-bar ITB1 can be formed using a screen printing method or a dispensing method using a dispenser. According to an embodiment, when the first inter-bar ITB1 is formed using a screen printing method, the insulator RS can be printed into a linear shape. According to an embodiment, when the first inter-bar ITB1 is formed using a dispenser, the insulator RS can be discharged by moving the dispenser from the second side S2 to the fourth side S4 or to the opposite side in the first direction D1.

According to an embodiment, the height H1 of the first inter-bar ITB1 can be less than the diameter of the conductive balls CB to prevent abnormal flow of the interlayer and improve adhesion between the first substrate SUB1 and the second substrate SUB2.

Figure 7A:
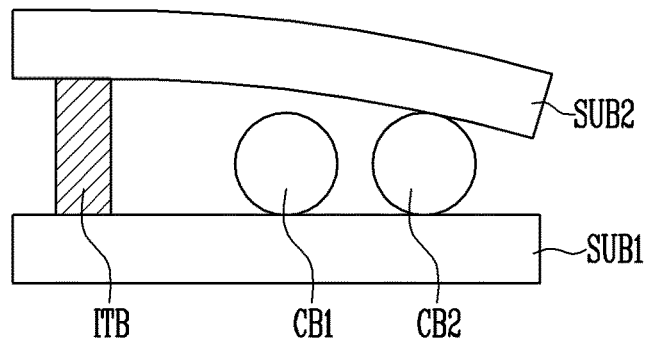
FIGS. 7A, 7B and 7C are cross-sectional views illustrating associations between a height of a first inter-bar and a diameter of a conductive ball.
Figure 7B:
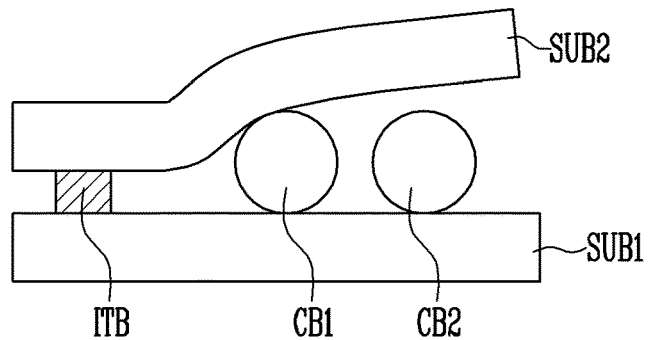
Figure 7C:
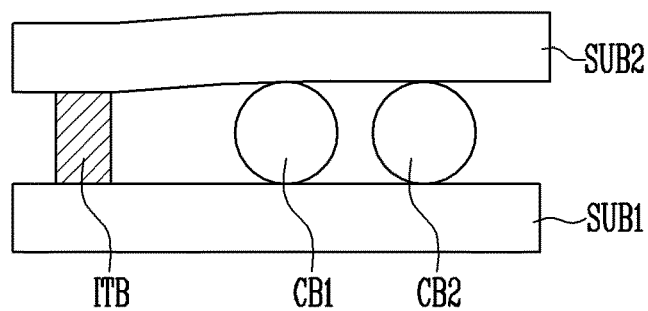
Figure 8:
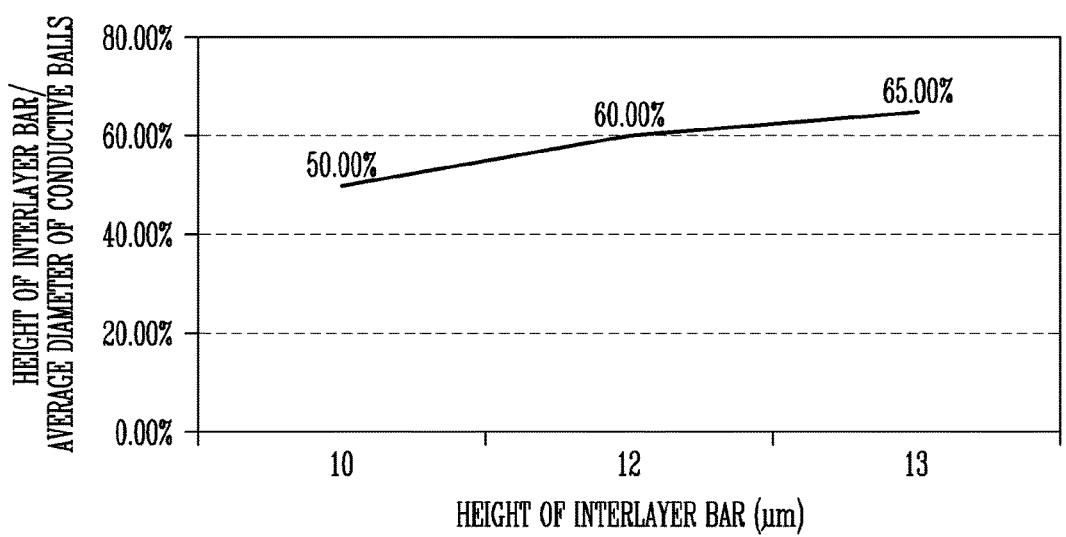
FIG. 8 is a graph illustrating a ratio between an average diameter of conductive balls and an inter-bar when an electrical connection failure does not occur.

FIGS. 7A to 7C are cross-sectional views illustrating associations between the height of the inter-bar ITB and the diameter of the conductive balls. FIG. 8 is a graph illustrating an average diameter of conductive balls and a height of an inter-bar when a failure of electrical connection occurs in the case that the conductive balls have a diameter of about 20 µm and the inter-bar ITB has a height of about 10 µm to about 13 µm. As illustrated in FIGS. 7A to 7C, for convenience of explanation, a conductive ball close to the inter-bar ITB is referred to as a first conductive ball CB1, and a conductive ball distant from the inter-bar ITB is referred to as a second conductive ball CB2.

Referring to FIG. 7A, when the height of the inter-bar ITB is excessively greater than the diameter of each of the first conductive ball CB1 and the second conductive ball CB2, the first conductive ball CB1 does not contact the second substrate SUB2 when the first substrate SUB1 and the second substrate SUB2 are attached to each other. For example, when the height of the inter-bar ITB is greater than about 65% of the diameter of each of the first and second conductive balls CB1 and CB2, it can be difficult to establish an electrical connection between the first and second conductive balls CB1 and CB2 adjacent to the inter-bar ITB.

Referring to FIG. 7B, when the height of the inter-bar ITB is excessively smaller than the diameter of the first and second conductive balls CB1 and CB2, the second conductive ball CB2 does not contact the second substrate SUB2 when the first substrate SUB1 and the second substrate SUB2 are attached to each other. For example, when the height of the inter-bar ITB is less than about 50% of the diameter of each of the first and second conductive balls CB1 and CB2, it can be difficult to establish an electrical connection of the second conductive ball CB2 distant from the inter-bar ITB after the first substrate SUB1 and the second substrate SUB2 are attached to each other.

Referring to FIG. 7C, when the height of the inter-bar ITB is less than, for example, 50% to 65% of the diameter of each of the first and second conductive balls CB1 and CB2, most of the first and second conductive balls CB1 and CB2 can be electrically connected to each other after the first substrate SUB1 and the second substrate SUB2 are attached to each other.

Referring again to FIGS. 1 to 4, and 6E, the first substrate SUB1 and the second substrate SUB2 can be attached to each other with the interlayer CTL, the first inter-bar ITB1, and the conductive member CM interposed therebetween.

When the first substrate SUB1 and the second substrate SUB2 are attached to each other, the first substrate SUB1 and the second substrate SUB2 can be compressed against each other in a direction in which the first and second substrates SUB1 and SUB2 face each other (a vertical direction in the drawings). The first and second substrates SUB1 and SUB2 can be compressed against each other in a top-to-bottom direction, i.e., in a direction from the second substrate SUB2 toward the first substrate SUB1. According to an embodiment, when the interlayer CTL, the first inter-bar ITB1, and the conductive member CM are formed on the second substrate SUB2, the first substrate SUB1 is located above the second substrate SUB2, and the first and second substrates SUB1 and SUB2 can be compressed against each other by applying pressure in a direction from the first substrate SUB1 toward the second substrate SUB2.

According to an embodiment, by compressing the first and second substrates SUB1 and SUB2 against each other, the surface of the first substrate SUB1 can contact a top surface of the first inter-bar ITB1. Since the interlayer CTL, the first inter-bar ITB1, and the conductive member CM include uncured or semi-cured materials, these components can have predetermined flowability and elasticity. Therefore, when pressure is applied from the top, the pressure can be applied until the surface of the first substrate SUB1 contacts the spacer in the first inter-bar ITB1. Since the spacer exists, the surface of the first substrate SUB1 and the surface of the second substrate SUB2 can be prevented from directly contacting each other.

When the pressure is released, the volume of the conductive member CM can be partially restored by the elasticity of the interlayer CTL, the first inter-bar ITB1 and the conductive member CM. The volume of the conductive member CM can be restored to a degree so that ambient atmospheric pressure and the elasticity of the interlayer CTL, the first inter-bar ITB1 and the conductive member CM can be in equilibrium.

In addition, since the first substrate SUB1 and the second substrate SUB2 are compressed against each other in the vertical direction, the conductive balls CB between the touch sensor pad part SP and the connection pad part CP can transform into an oval shape. The first diameter RD1 after compression can be less than a first diameter RD1' before compression, and the second diameter RD2 after compression can be greater than a second diameter RD2' before compression. However, the average of diameters before and after compression can remain unchanged or change slightly.

The touch sensor pad part SP and the connection pad part CP can be electrically connected to each other by the transformed conductive balls CB.

Referring to FIGS. 1 to 4, and 6F, the interlayer CTL, the first inter-bar ITB1 and the conductive member CM can be cured when the first substrate SUB1 and the substrate SUB2 are attached to each other with the interlayer CTL, the first inter-bar ITB1, and the conductive member CM interposed therebetween.

During the above curing process, all of the interlayer CTL, the first inter-bar ITB1, and the conductive member CM can be cured, so that the first substrate SUB1 and the second substrate SUB2 can be firmly attached to each other. The interlayer CTL can spread outwards in a region during the above curing process. However, the first inter-bar ITB1 can block the interlayer CTL from spreading in a direction in which the touch sensor pad part SP and the connection pad part CP are formed. When the interlayer CTL spreads out to a portion blocked by the first inter-bar ITB1, the side surface of the first inter-bar ITB1 at the display area DA can directly contact the material of the interlayer CTL. Therefore, contamination of the touch sensor pad part SP and the connection pad part CP by the interlayer CTL can be prevented. When the first inter-bar ITB1 is not provided, the interlayer CTL can spread out to the pad parts including the touch sensor pad parts SP, the connection pad part CP and the driving pad part OP. The conductive balls CB can be swept away by the interlayer CTL, and infiltrate into between conductive balls CB and the pad parts to obstruct contact therebetween. As a result, even when the conductive member CM is formed, an electrical connection failure can occur between the touch sensor pad part SP and the connection pad part CP.

Figure 6A:
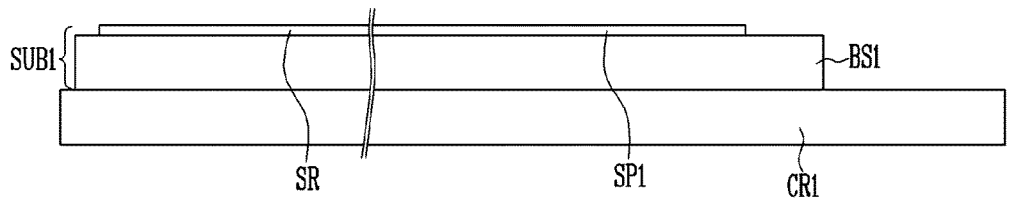
FIGS. 6A, 6B, 6C, 6D, 6E, 6F and 6G are cross-sectional views sequentially illustrating a method of manufacturing a display device according to an embodiment.
Figure 6B:
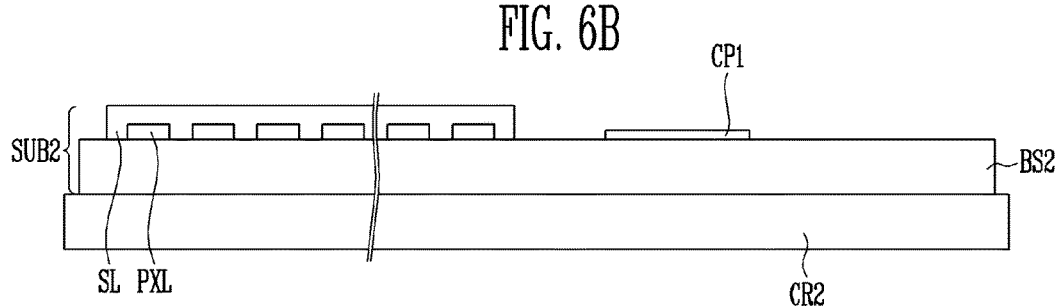
Figure 6C:
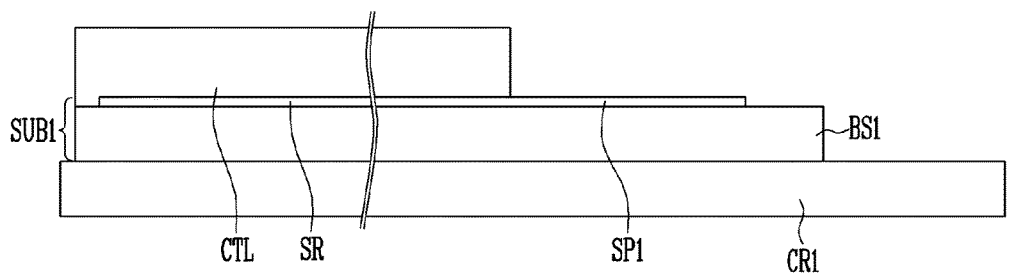
Figure 6D:
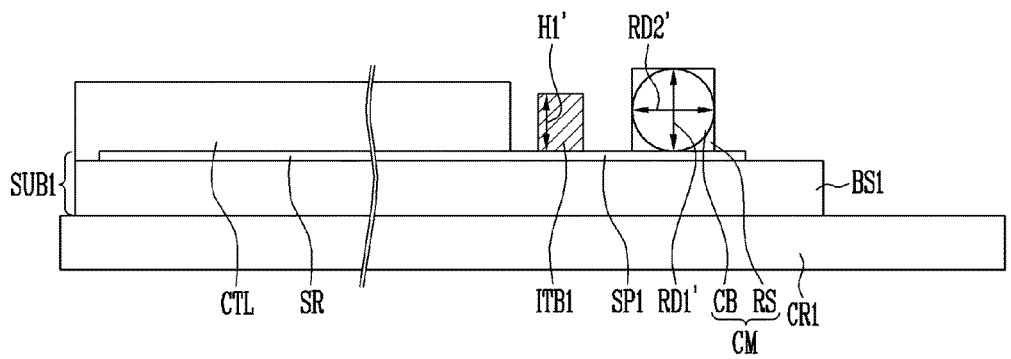
Figure 6E:
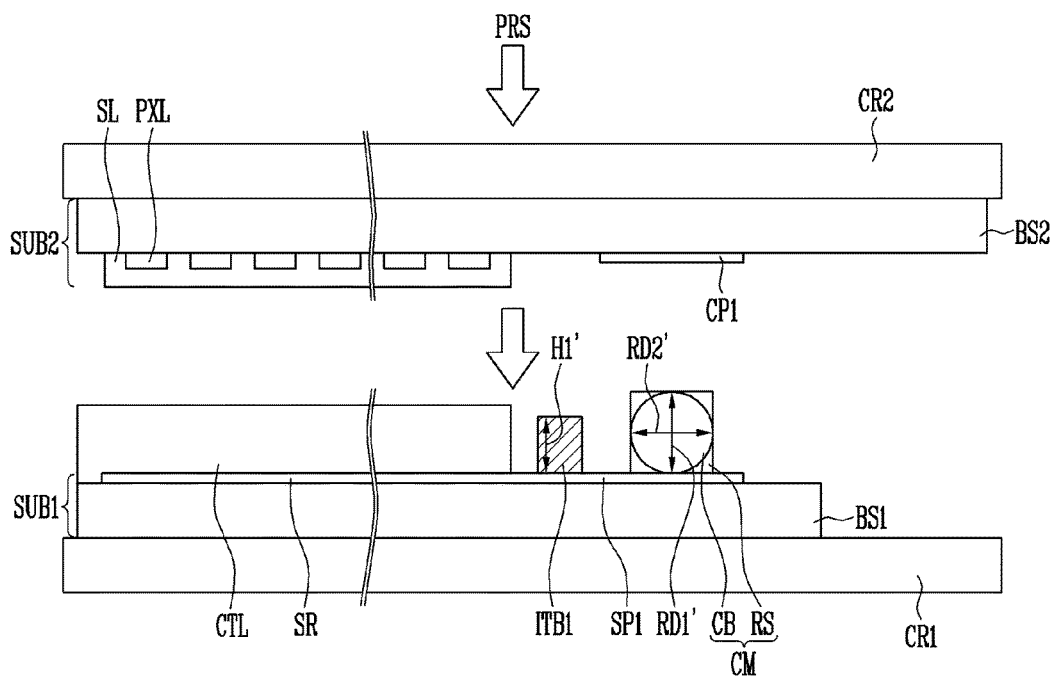
Figure 6F:
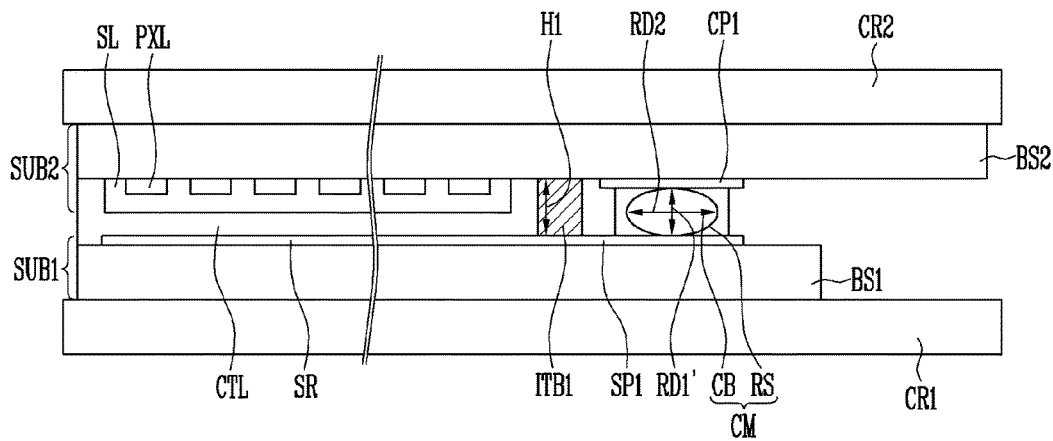
Figure 6G:
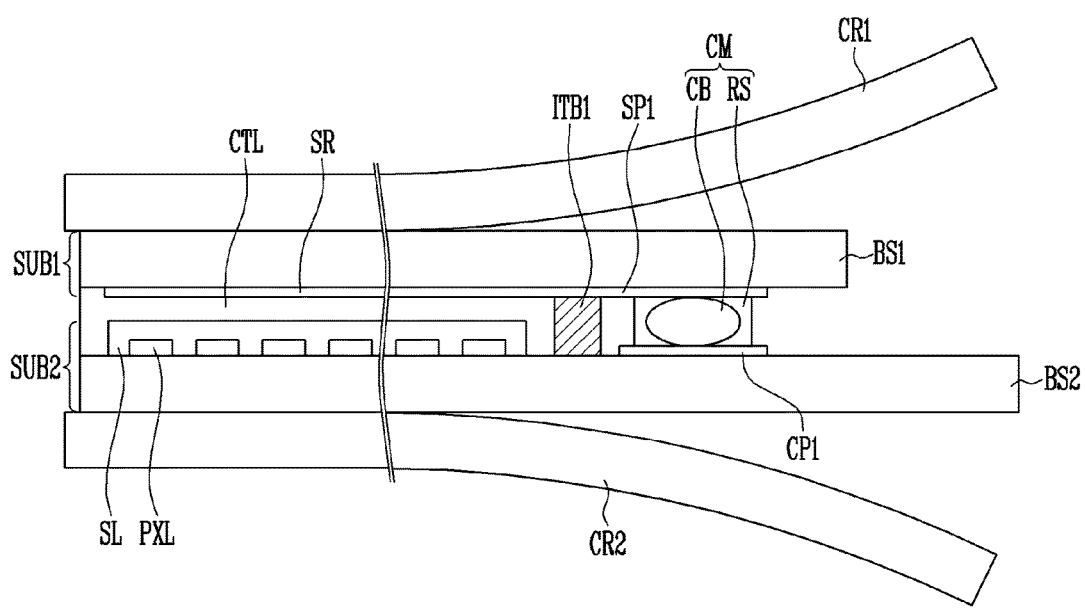

Referring to FIGS. 1 and 6G, the manufactured display device is reversed, the first carrier substrate CR1 and the second carrier substrate CR2 can be removed. When the first carrier substrate CR1 is separated from the first substrate SUB1 and the second carrier substrate CR2 is separated from the second substrate SUB2, stress can be applied to the first substrate SUB1 and the second substrate SUB2 in an outward direction. However, by providing the first inter-bar ITB1 between the first substrate SUB1 and the second substrate SUB2, separation between the conductive member CM and the first substrate SUB1 and between the conductive member CM and the second substrate SUB2 caused by the applied stress can be prevented. As a result, a poor contact between the conductive member CM and the pad part can be prevented.

Figure 9:
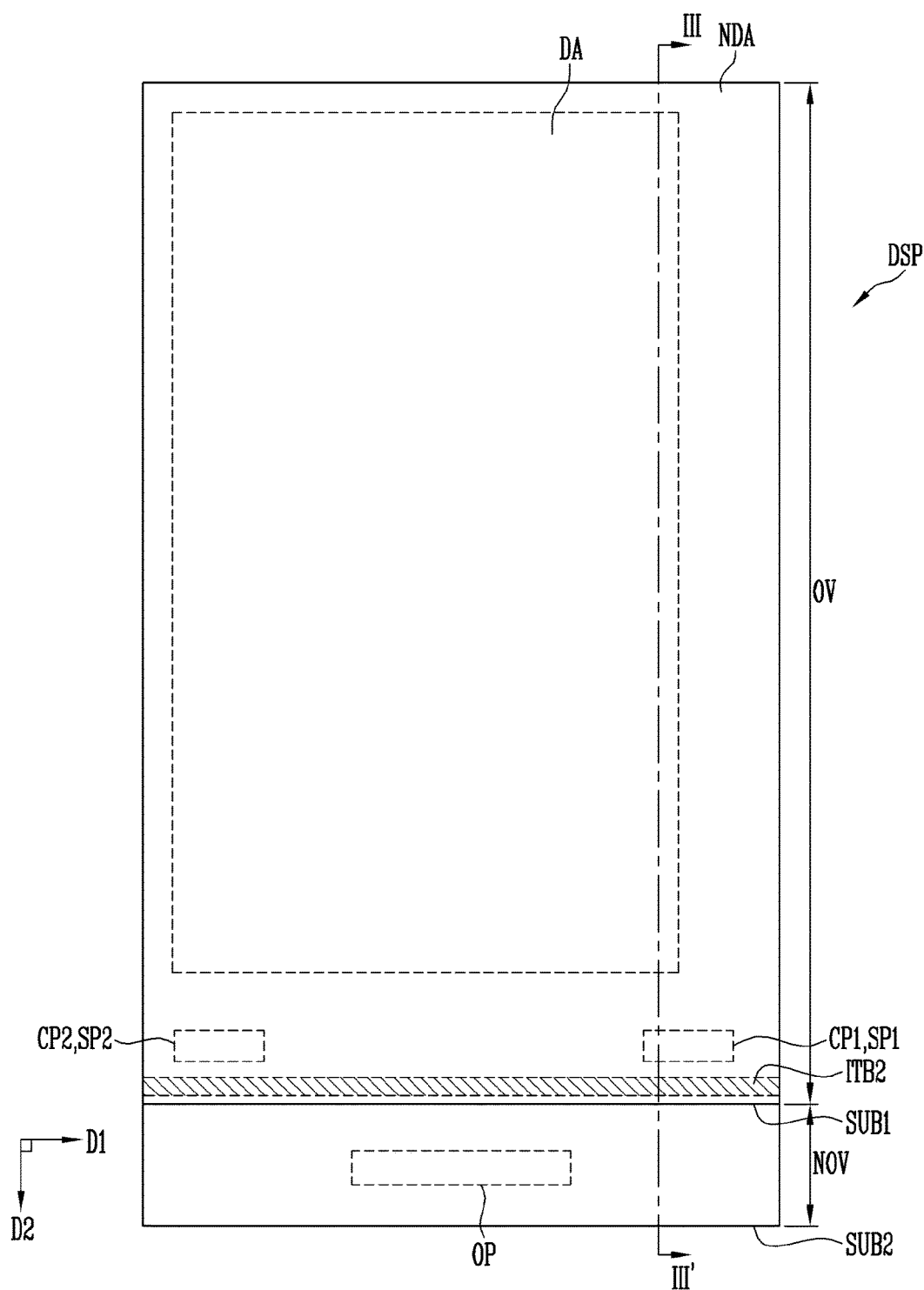
FIG. 9 is a plan view illustrating a display device according to another embodiment.
Figure 10:
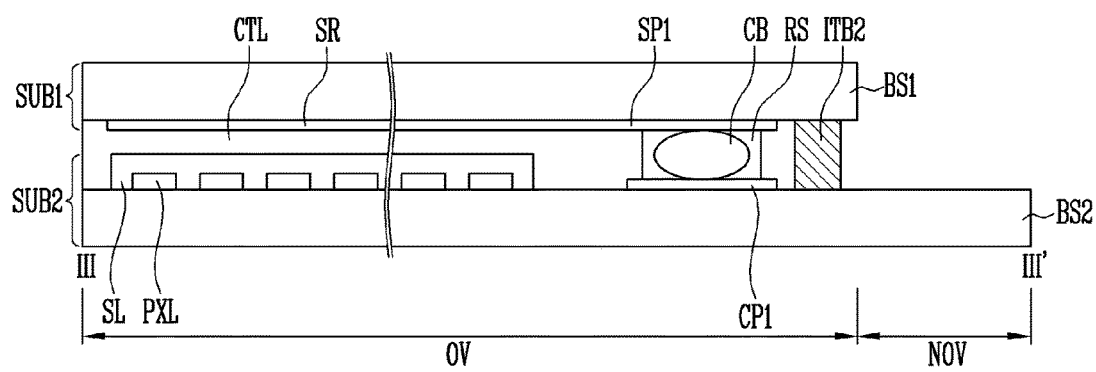
FIG. 10 is a cross-sectional view taken along line III-III' of FIG. 9.

FIG. 9 is a plan view illustrating a display device according to another embodiment. FIG. 10 is a cross-sectional view taken along line III-III' of FIG. 9. To avoid redundant description, differences from the above-described embodiments are mainly described.

Referring to FIGS. 9 and 10, according to another embodiment, the display device DSP can include a second inter-bar ITB2 provided between the display area DA and the driving pad part OP in the non-display area NDA between the first substrate SUB1 and the second substrate SUB2. The second inter-bar ITB2 can be provided between the connection pad part CP (or touch sensor pad part SP) and the driving pad part OP and separated from the display area DA with the connection pad part CP interposed therebetween as viewed in plan view.

The second inter-bar ITB2 can attach the first substrate SUB1 and the second substrate SUB2 to each other and prevent the interlayer CTL from extending to the driving pad part OP. As viewed in plan view, the second inter-bar ITB2 can be provided between the interlayer CTL and the driving pad part OP, for example, between the touch sensor pad part SP and the connection pad part CP and the driving pad part OP. The side surface of the second inter-bar ITB2 at the display area DA can directly contact the material of the interlayer CTL.

The second inter-bar ITB2 provided adjacent to the first conductive member CM can stably attach the first substrate SUB1 and the second substrate SUB2 to each other and prevent the first conductive member CM from being detached from the first substrate SUB1 or the second substrate SUB2.

The second inter-bar ITB2 can correspond to the first side S1 and extend in the same direction as the first side S1. The second inter-bar ITB2 can be provided only at the first side S1. For example, the second inter-bar ITB2 is not provided at the second, third, and fourth sides S2, S3, and S4. According to an embodiment, the second inter-bar ITB2 can be formed in a single body along the first side S1 so that one end of the second inter-bar ITB2 can meet the fourth side S4 and the other end thereof can meet the second side S2.

As described above, the second inter-bar ITB2 can prevent the interlayer CTL from flowing to the driving pad part OP and firmly fix the first substrate SUB1 and the second substrate SUB2 to each other, thereby preventing a poor contact between the conductive member CM and the pad parts.

Figure 11:
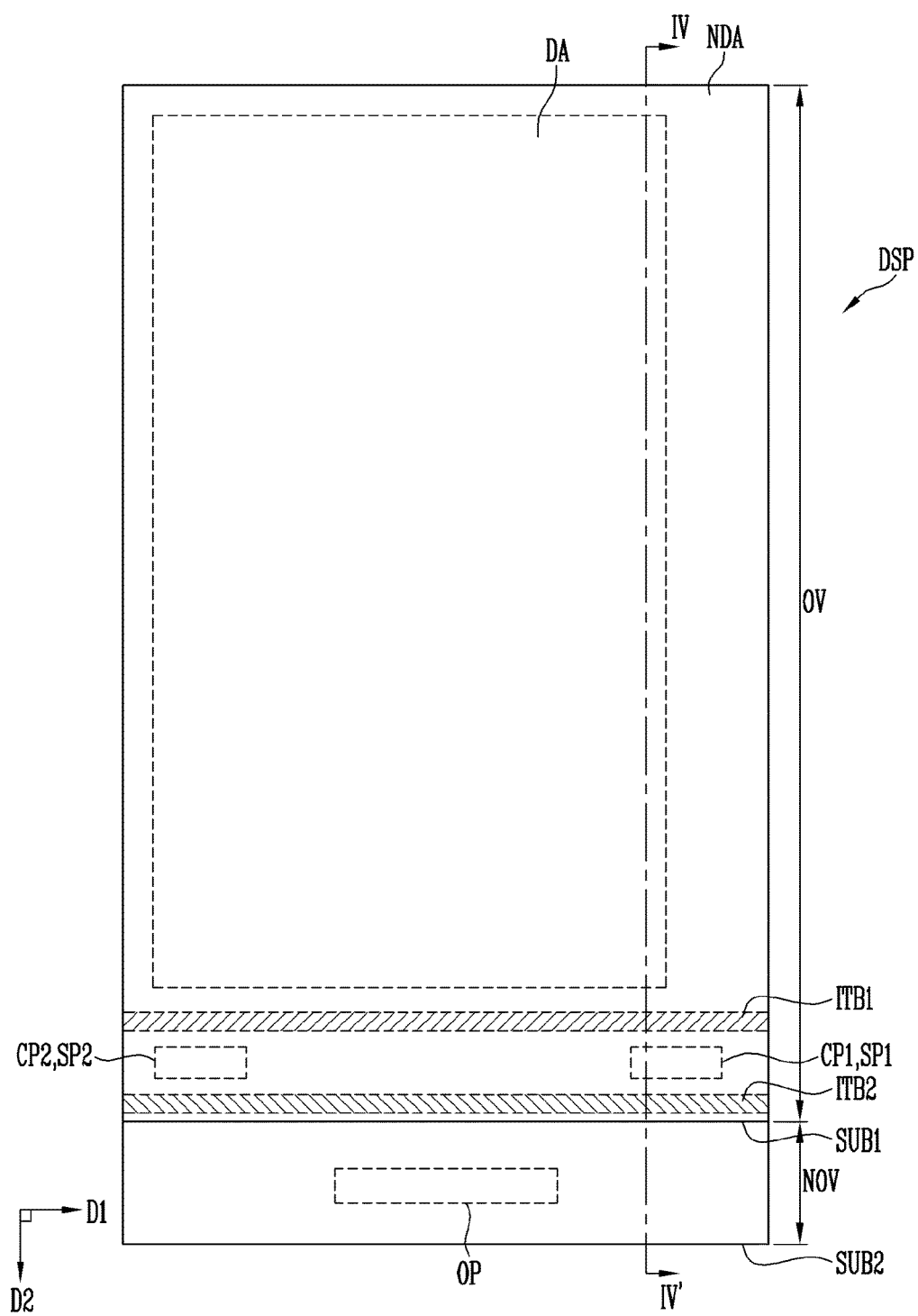
FIG. 11 is a plan view illustrating a display device according to another embodiment.
Figure 12:
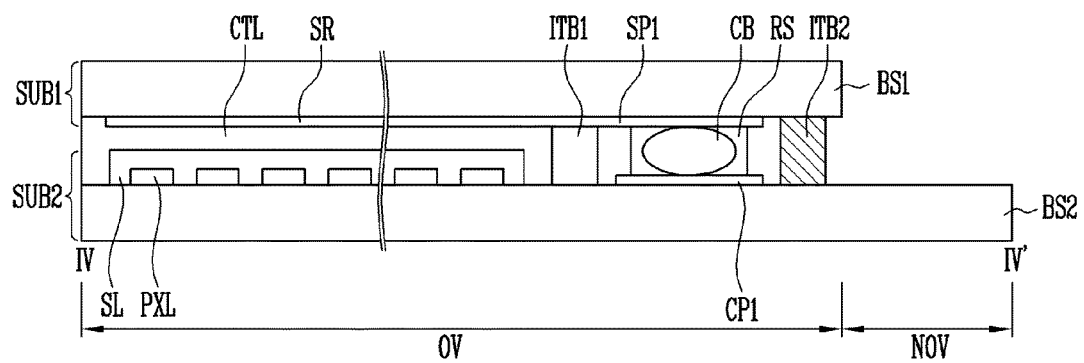
FIG. 12 is a cross-sectional view taken along line IV-IV' of FIG. 11.

FIG. 11 is a plan view illustrating the display device DSP according to another embodiment. FIG. 12 is a cross-sectional view taken along line IV-IV' of FIG. 11.

Referring to FIGS. 11 and 12, according to another embodiment, the display device DSP can include the first inter-bar ITB1 provided between the display area DA and the touch sensor pad part SP/connection pad part CP and the second inter-bar ITB2 provided between the display area DA and the driving pad part OP in the non-display area NDA between the first substrate SUB1 and the second substrate SUB2. For example, the second inter-bar ITB2 can be provided between the connection pad part CP (or touch sensor pad parts SP) and the driving pad part OP and separated from the display area DA with the connection pad part CP interposed therebetween as viewed in plan view.

The first inter-bar ITB1 and the second inter-bar ITB2 can attach the first substrate SUB1 and the second substrate SUB2 to each other and prevent the interlayer CTL from extending to the touch sensor pad part SP/connection pad part CP and the driving pad part OP.

The first inter-bar ITB1 and the second inter-bar ITB2 can correspond to the first side S1 and extend in the same direction as the first side S1. The second inter-bar ITB2 can be provided only at the first side S1. For example, the second inter-bar ITB2 is not provided at the second, third, and fourth sides S2, S3, and S4. According to an embodiment, each of the first inter-bar ITB1 and the second inter-bar ITB2 can be formed in a single body along the first side S1 so that one end thereof can meet the fourth side S4 and the other end can meet the second side S2.

Figure 13A:
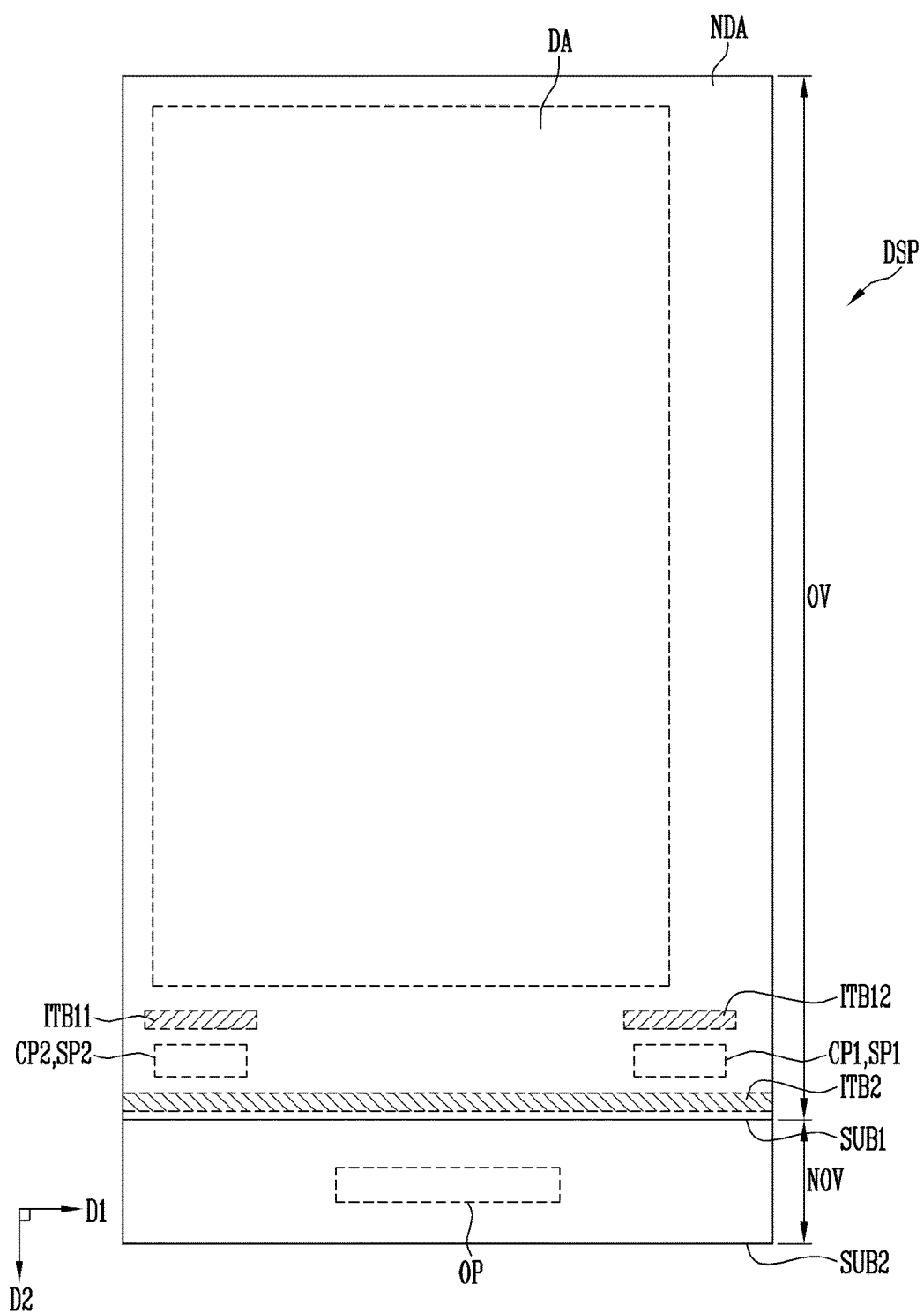
FIGS. 13A, 13B and 13C are plan views illustrating a display device according to other embodiments.
Figure 13B:
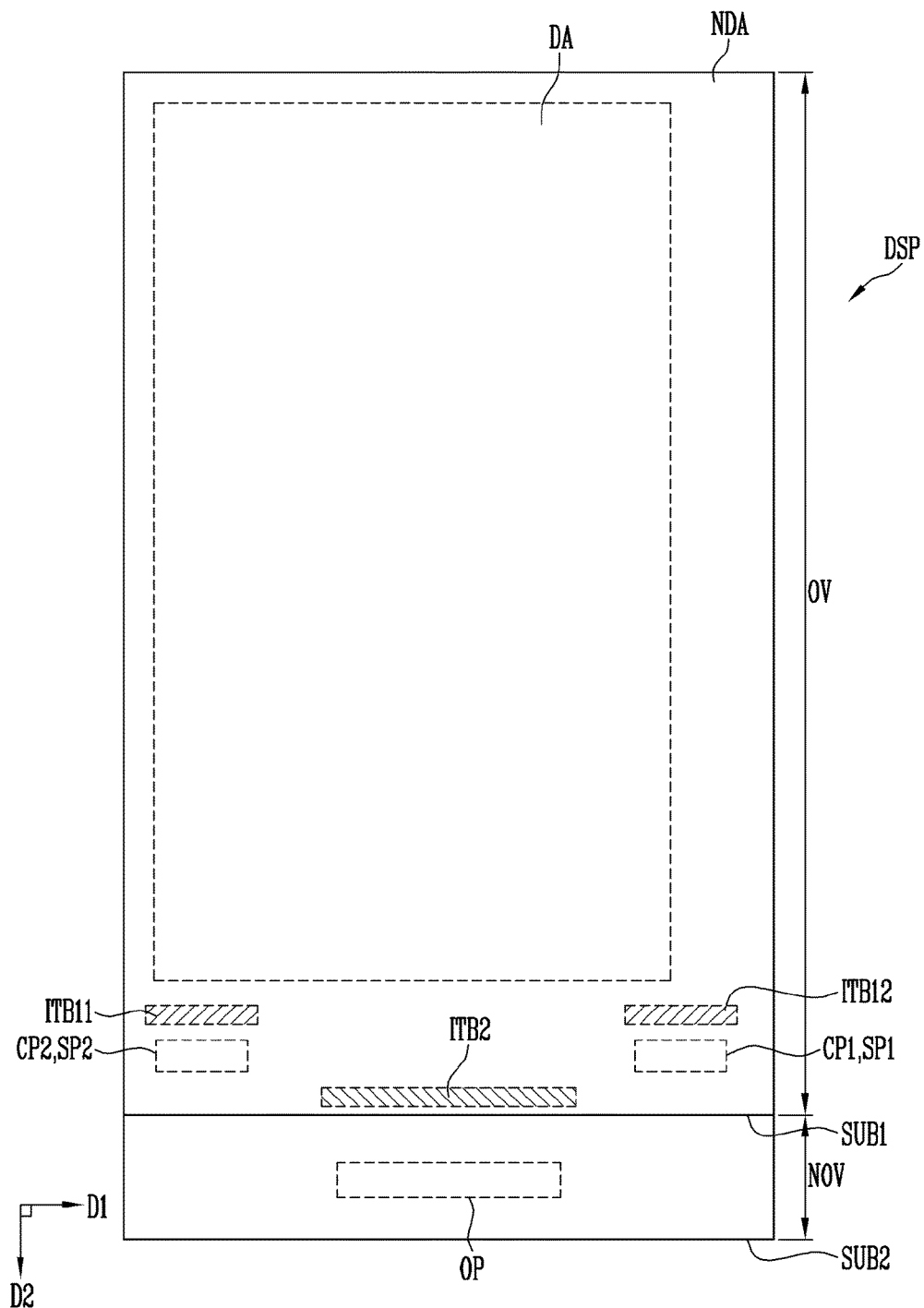
Figure 13C:
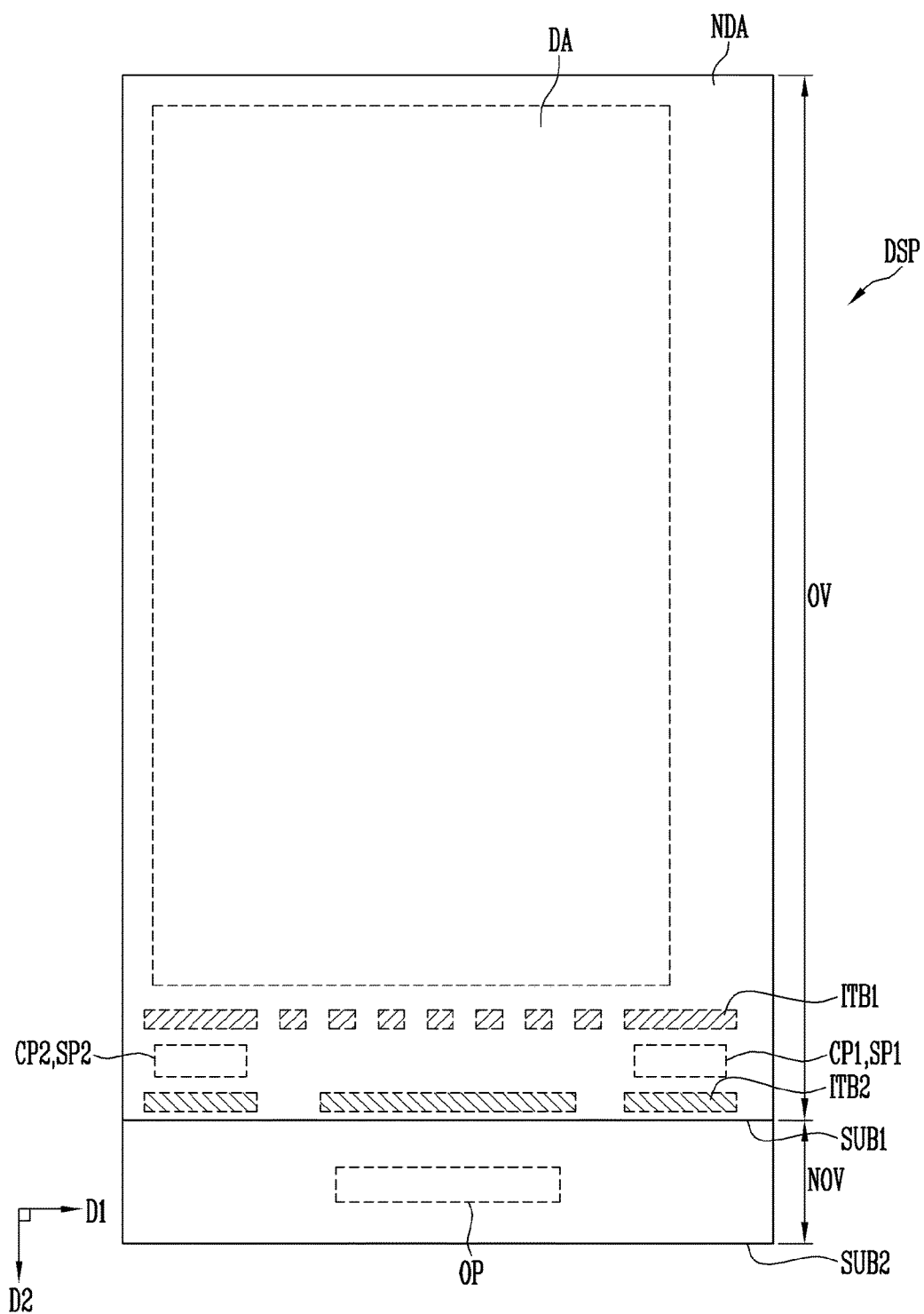

FIGS. 13A to 13C are plan views illustrating the display device DSP according to other embodiments.

Referring to FIGS. 13A and 13B, the first inter-bar ITB1 and the second inter-bar ITB2 can prevent the interlayer CTL from moving during manufacturing processes. The first and second inter-bars ITB1 and ITB2 can have various shapes that can improve adhesion between the first substrate SUB1 and the second substrate SUB2.

For example, the shape of the first inter-bar ITB1 can depend on the shape of the touch sensor pad part SP/connection pad part CP, and the shape of the second inter-bar ITB2 can depend on the shape of the driving pad part OP.

Referring to FIG. 13A, the first inter-bar ITB1 can be separated into a plurality of bars (ITB11 and ITB12). For example, the touch sensor pad part SP can include the first touch sensor pad part SP1 and the second touch sensor pad part SP2 extending in length in the first direction D1. The first inter-bar ITB1 can include two first inter-bars ITB11 and ITB12 corresponding to the first touch sensor pad part SP1 and the second touch sensor pad part SP2, respectively, and extending in length in the first direction D1. The first inter-bars ITB11 and ITB12 corresponding to the first touch sensor pad part SP1 and the second touch sensor pad part SP2, respectively, can have lengths substantially the same as or greater than the first touch sensor pad part SP1 and the second touch sensor pad part SP2, respectively, so that first touch sensor pad part SP1 and the second touch sensor pad part SP2 can be sufficiently covered by the first inter-bars ITB11 and ITB12, respectively.

A region where the first inter-bars ITB11 and ITB12 are separated from each other can correspond to a region where the first touch sensor pad part SP1 and the second touch sensor pad part SP2 are separated from each other. According to an embodiment, the second inter-bar ITB2 can extend in a single body along the first side S1.

Referring to FIG. 13B, the first inter-bar ITB1 can be divided into two bars ITB11 and ITB12 separated from each other as illustrated in FIG. 13A. According to an embodiment, the second inter-bar ITB2 can be provided only at a portion where the driving pad part OP is formed. The second inter-bar ITB2 can have a length substantially the same as or greater than the length of the driving pad part OP so that the driving pad part OP can be sufficiently covered by the second inter-bar ITB2.

Referring to FIG. 13C, each of the first inter-bar ITB1 and the second inter-bar ITB2 can be divided into at least three bars arranged in the first direction.

The display devices having the above-described configurations and manufactured by the above-described method can further have the following advantages. By forming the inter-bar, the interlayer can be prevented from flowing over components in the non-display area, for example, the touch sensor pad part, the connection pad part, the driving pad part and/or the testing pad part, so that a poor contact at the pad part can be prevented. In addition, since a separate structure for preventing an overflow of the interlayer is unnecessary, processes can be simplified and costs can be reduced. In addition, the inter-bar can support the conductive member adjacent thereto so as to be firmly fixed between the first substrate and the second substrate, so that a poor contact at the pad part between the first substrate and the second substrate can be prevented. In addition, since the first substrate and the second substrate are firmly attached to each other, double-sided etching of the first base substrate and the second base substrate can be possible after the first and second base substrates are completely attached to each other. An ultra-slim display device can be implemented through the double-sided etching of the first and second base substrates.

According to the described technology, contamination of pad parts (a touch sensor pad part, a connection pad part, and a driving pad part) can be prevented by providing an inter-bar to prevent the interlayer from flowing to another region during a manufacturing process. In addition, the inter-bar can support adhesion between a conductive member and the pad parts (a touch sensor pad part, a connection pad part, and a driving pad part) when a carrier substrate is removed, to thereby prevent separation between the conductive member and the pad parts. Therefore, a poor contact between the conductive member and the pad parts can be prevented to provide a high quality display device.

By way of summation and review, a display device allows the path length of light, which is emitted from a display panel and then is incident onto a light sensor, to be kept constant. Therefore, it is possible to prevent the path length of the light that is incident onto the light sensor from being changed by external shocks or the like.

The inventive technology has been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment can be used singly or in combination with features, characteristics, and/or elements described in connection with other embodiments unless otherwise specifically indicated. Accordingly, it will be understood by those of skill in the art that various changes in form and details can be made without departing from the spirit and scope of the present invention as set forth in the following claims.

What is claimed is:

1. A display device, comprising:
 a display area configured to display an image;
 a non-display area adjacent to the display area;
 a first substrate including a touch sensor in the display area and a touch sensor pad in the non-display area;
 a second substrate opposing the first substrate, the second substrate including a pixel in the display area and a connection pad in the non-display area;
 an interlayer in the display area provided between the first substrate and the second substrate;
 a plurality of conductive balls electrically connecting the touch sensor pad and the connection pad; and an inter-bar in the non-display area provided between the first substrate and the second substrate, the inter-bar disposed adjacent to the connection pad, wherein the conductive balls have an average diameter that is greater than the height of the inter-bar.

2. The display device of claim 1, wherein the conductive balls have a spherical or elliptical shape, and wherein the height of the inter-bar is in the range of about 50% to about 65% of the average diameter of the conductive balls.

3. The display device of claim 2, wherein the average diameter of the conductive balls is in the range of about 16 µm to about 24 µm.

4. The display device of claim 2, wherein the height of the inter-bar is in the range of about 10 µm to about 13 µm.

5. The display device of claim 2, wherein the difference between the average diameter of the conductive balls and the height of the inter-bar is about 3 µm or more.

6. The display device of claim 1, wherein the inter-bar includes a plurality of spacers and a binder having the spacers therein.

7. The display device of claim 6, wherein the spacers are spherical.

8. The display device of claim 7, wherein the spacers have a diameter less than or equal to the height of the inter-bar.

9. The display device of claim 8, wherein a ratio of the average diameter of the conductive balls to diameters of the spacers is in the range of about 10:2 to about 10:3.

10. The display device of claim 1, wherein the first substrate has a rectangular shape including first to fourth sides, and wherein the touch sensor pad is provided adjacent to the first side.

11. The display device of claim 10, wherein the interlayer has at least one side extends from the second to fourth sides.

12. The display device of claim 11, wherein the second to fourth sides face the exterior of the display device.

13. The display device of claim 10, wherein at least a portion of the inter-bar extends in a direction in which the first side extends.

14. The display device of claim 13, wherein the inter-bar extends from the fourth side to the second side along the first side.

15. The display device of claim 1, wherein the inter-bar is provided between the display area and the connection pad.

16. The display device of claim 15, wherein the connection pad includes a first connection pad and a second connection pad spaced apart from each other, and wherein the inter-bar includes a plurality of inter-bars respectively formed adjacent to the first and second connection pads.

17. The display device of claim 1, wherein the second substrate further includes a driving pad configured to transmit an image signal to the display area, and wherein the inter-bar is provided between the display area and the driving pad.

18. The display device of claim 17, wherein the inter-bar is separated from the display area with the connection pad interposed therebetween.

19. The display device of claim 1, wherein the inter-bar includes a first inter-bar provided between the display area and the connection pad and a second inter-bar separated from the display area with the connection pad interposed therebetween as viewed.

20. The display device of claim 19, wherein the connection pad includes a first connection pad and a second connection pad spaced apart from each other, and wherein the first and second inter-bars are spaced apart from each other and respectively correspond to the first and second connection pads.

21. The display device of claim 19, wherein the first substrate further includes a driving pad configured to transmit an image signal to the display area, and wherein the second inter-bar is provided between the display area and the driving pad.

22. The display device of claim 1, further comprising connection lines electrically connecting the touch sensor and the touch sensor pad.

23. The display device of claim 22, wherein the touch sensor includes a first sensing unit and a second sensing unit crossing each other, and wherein the touch sensor pad includes a first touch sensor pad connected to the first sensing unit and a second touch sensor pad connected to the second sensing unit.

24. The display device of claim 23, wherein the connection pad includes a first connection pad corresponding to the first touch sensor pad and a second connection pad corresponding to the second touch sensor pad.

25. The display device of claim 1, further comprising an insulator surrounding the conductive balls.

26. A method of manufacturing a display device including a display area and a non-display area, the method comprising:

forming a first substrate including a touch sensor in the display area and a touch sensor pad in the non-display area;

forming a second substrate including a pixel in the display area and a connection pad in the non-display area;

forming an interlayer in the display area of one of the first and second substrates;

forming an inter-bar in the non-display area of one of the first and second substrates;

forming a plurality of conductive balls over the connection pad or the touch sensor pad; and attaching the first substrate to the second substrate, wherein the conductive balls have an average diameter that is greater than the height of the inter-bar.

27. The method of claim 26, wherein the conductive balls are spherical, and wherein the height of the inter-bar is in the range of about 50% to about 65% of the diameter of the conductive balls.

28. The method of claim 27, wherein the diameters of the conductive balls is in the range of about 16 µm to about 24 µm.

29. The method of claim 27, wherein the height of the inter-bar is in the range of about 10 µm to about 13 µm.

30. The method of claim 27, wherein the difference between the average diameter of the conductive balls and the height of the inter-bar is about 3 µm.

31. The method of claim 26, wherein the inter-bar includes a plurality of spacers and a binder having the spacers therein.

32. The method of claim 31, wherein the spacers are spherical.

33. The method of claim 32, wherein each of the spacers has a diameter that is less than or equal to the height of the inter-bar.

34. The method of claim 32, wherein a ratio of the average diameter of the conductive balls to the diameters of the spacers is in the range of about 10:2 to about 10:3.

35. The method of claim 26, wherein the first substrate has a rectangular shape including first to fourth sides, and wherein the non-display area faces the first side.

36. The method of claim 35, wherein at least a portion of the inter-bar extends in a direction in which the first side extends.

37. The method of claim 36, wherein the inter-bar is not formed at the second to fourth sides.

38. The method of claim 26, wherein the inter-bar is provided between the display area and the connecting pad.

39. The method of claim 26, wherein the second substrate further includes a driving pad transmitting an image signal to the display area, and wherein the inter-bar is provided between the display area and the driving pad.

40. The method of claim 26, wherein the inter-bar includes a first inter-bar provided between the display area and the connection pad and a second inter-bar separated from the display area with the connection pad interposed therebetween.

41. The method of claim 26, wherein the forming of the first substrate comprises:
   providing a first carrier substrate at a rear surface of the first base substrate; and
   forming the touch sensor and the touch sensor pad on a top surface of the first base substrate, and
   wherein the forming of the second substrate comprises:
   providing a second carrier substrate at a rear surface of the second base substrate; and
   forming the pixel and the connection pad over a top surface of the second base substrate.

42. The method of claim 41, further comprising:
   attaching the first substrate and the second substrate to each other; and
   subsequently removing the first carrier substrate and the second carrier substrate.

* * * * *